US009496790B2

(12) United States Patent
Iwamoto et al.

(10) Patent No.: US 9,496,790 B2
(45) Date of Patent: Nov. 15, 2016

(54) POWER CONVERSION DEVICE

(71) Applicant: DENSO CORPORATION, Kariya, Aichi (JP)

(72) Inventors: Fujiyuki Iwamoto, Kariya (JP); Kazuhiro Umetani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 56 days.

(21) Appl. No.: 14/678,229

(22) Filed: Apr. 3, 2015

(65) Prior Publication Data

US 2015/0288290 A1    Oct. 8, 2015

(51) Int. Cl.
| | |
|---|---|
| *H02M 3/337* | (2006.01) |
| *H02M 3/158* | (2006.01) |
| *B60L 7/14* | (2006.01) |
| *B60L 11/18* | (2006.01) |

(52) U.S. Cl.
CPC ........... *H02M 3/1582* (2013.01); *B60L 7/14* (2013.01); *B60L 11/1803* (2013.01); *B60L 11/1861* (2013.01); *H02M 3/158* (2013.01); *B60L 2210/30* (2013.01); *B60L 2240/12* (2013.01); *B60L 2240/547* (2013.01); *B60L 2240/549* (2013.01)

(58) Field of Classification Search
CPC .. H02M 3/335; H02M 3/337; H02M 3/3376; H02M 3/3155; H02M 1/12
USPC .................................. 363/24, 25, 39, 40, 131
See application file for complete search history.

(56) References Cited

U.S. PATENT DOCUMENTS

| | | | | |
|---|---|---|---|---|
| 5,057,990 A | * | 10/1991 | Gulczynski | H02M 3/1582 323/350 |
| 8,593,836 B2 | * | 11/2013 | Umetani | H02M 3/158 363/131 |
| 2011/0107123 A1 | * | 5/2011 | Nishimura | H02J 3/32 713/300 |
| 2012/0069604 A1 | * | 3/2012 | Yagyu | H02M 1/34 363/20 |
| 2012/0099348 A1 | | 4/2012 | Umetani | |
| 2014/0354254 A1 | * | 12/2014 | Iwamoto | H02M 3/158 323/282 |

FOREIGN PATENT DOCUMENTS

JP    2006-230053 A    8/2006

* cited by examiner

*Primary Examiner* — Adolf Berhane
(74) *Attorney, Agent, or Firm* — Posz Law Group, PLC

(57) ABSTRACT

In a power conversion apparatus, a secondary winding is connected between main terminals of one of two circuit elements included in a main series circuit, and a voltage applied to a primary winding induces a voltage in a secondary winding in a direction from a first main terminal of a secondary winding, which is disposed at a low-potential side of the main series circuit, toward a second main terminal of a secondary winding, which is disposed at a high-potential side of the main series circuit. A rectifying unit blocks a current flowing from the high-potential side of the main series circuit toward the low-potential side of the main series circuit in a current path that includes the secondary winding and bypasses one of the two circuit elements included in the main series circuit.

20 Claims, 33 Drawing Sheets

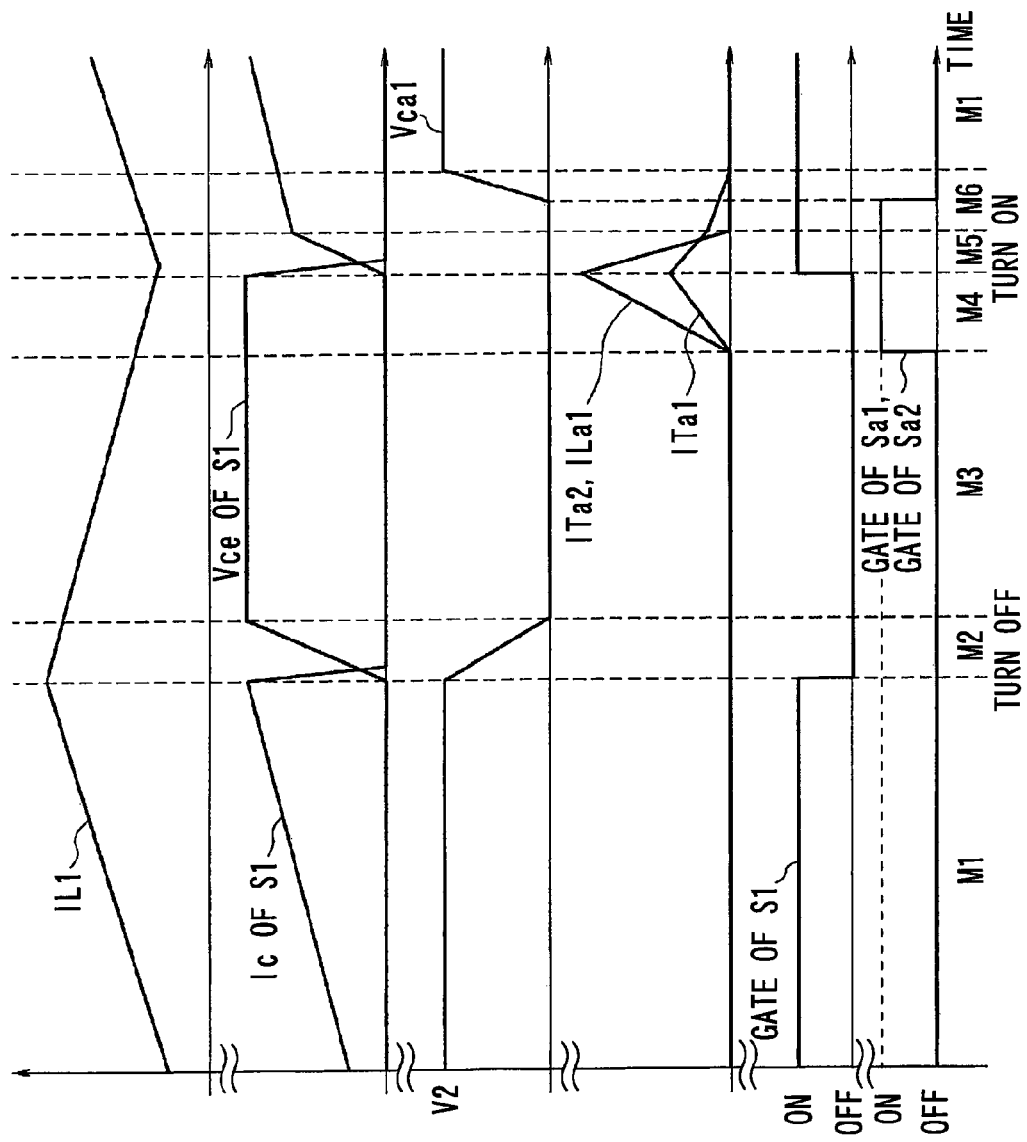

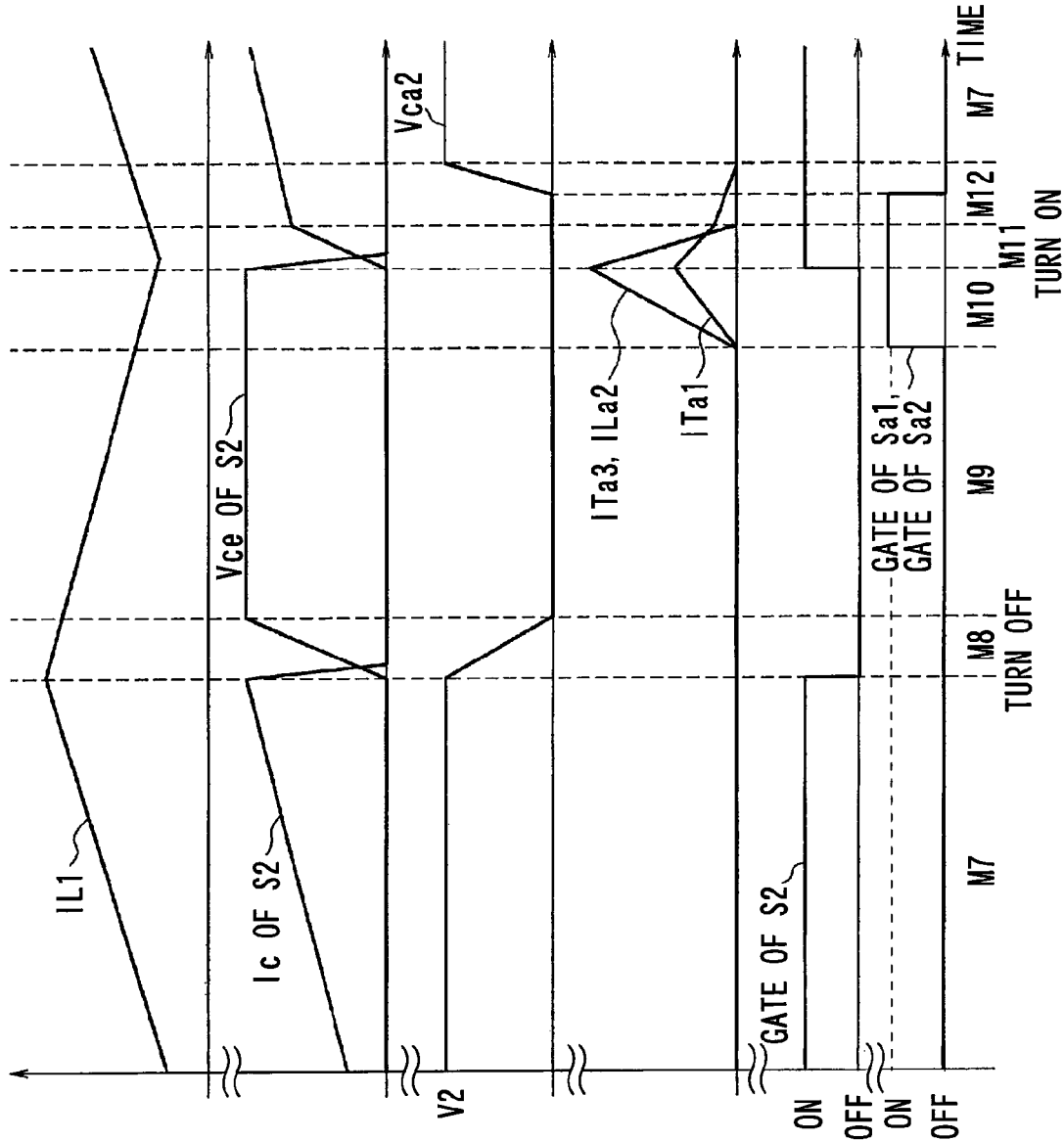

POWER CONVERSION DEVICE

CROSS REFERENCE TO RELATED APPLICATION

This application is based on Japanese Patent Application No. 2014-078622 filed on Apr. 7, 2014, the disclosure of which is incorporated herein by reference.

TECHNICAL FIELD

The present disclosure relates to a power conversion device that converts an input power and outputs a converted power.

BACKGROUND

A power conversion device, such as a switching power supply device used for a motor drive system of an electric car or a hybrid car is required particularly to be downsized due to a vehicle space. To realize downsizing of the device, for example, it is considered to reduce the size of a passive element (such as a smoothing capacitor, an input reactor) used for the device. A size of the passive element can be reduced by increasing a drive frequency (switching frequency). However, such increase in the frequency causes increase in a switching loss, and power conversion efficiency may be deteriorated.

Under such circumstances, a technique is demanded for reducing a switching loss by adding a circuit which has a sufficiently compact size to restrict a size increasing of the device. For example, JP 2012-110208 A (corresponding to US 2012/0099348 A1) discloses a configuration in which a circuit including magnetic components is added to a switching power supply device having a bidirectional chopper. With such a configuration, a current flowing through a switching element and a voltage across both ends of the switching element are suppressed from overlapping with one another, and as a result, a switching loss is reduced.

However, in the configuration described in JP 2012-110208 A, four magnetic components, such as a transformer and an inductor are additionally necessary for reducing a switching loss of the bidirectional chopper. Usually, such a magnetic component has a larger size and needs higher cost compared with other circuit elements, such as a resistor or a capacitor. Consequently, the configuration described in JP 2012-110208 A also has a large size and requires a higher cost for manufacturing the device.

SUMMARY

In view of the foregoing difficulties, it is an object of the present disclosure provide a power conversion device capable of reducing a switching loss and suppressing increase in a size of the device.

According to an aspect of the present disclosure, a power conversion device includes a main series circuit, a main inductance element, a transformer, an auxiliary switching unit, and a rectifying unit. The main series circuit includes two circuit elements connected in series with each other at a common connection point. The main inductance element is connected with the common connection point of the main series circuit. The transformer has a primary winding and a secondary winding. The auxiliary switching unit switches an operation state of the primary winding between a conduction state and non-conduction state. The rectifying unit allows an electric current to flow in one direction and blocks an electric current in an opposite direction. The primary winding is connected with the main series circuit in parallel via the auxiliary switching unit. The secondary winding is connected between main terminals of one of the two circuit elements included in the main series circuit, and a voltage applied to the primary winding via the auxiliary switching unit induces a voltage in the secondary winding in a direction from a first main terminal of the secondary winding, which is disposed at a low-potential side of the main series circuit, toward a second main terminal of the secondary winding, which is disposed at a high-potential side of the main series circuit. The rectifying unit blocks a current flowing from the high-potential side of the main series circuit toward the low-potential side of the main series circuit in a current path that includes the secondary winding and bypasses the one of the two circuit elements included in the main series circuit.

With the above power conversion device, a switching loss can be reduced and a size of the device can be reduced.

BRIEF DESCRIPTION OF THE DRAWINGS

The above and other objects, features and advantages of the present disclosure will become more apparent from the following detailed description made with reference to the accompanying drawings. In the drawings:

FIG. 2A to FIG. 2F are diagrams showing respective parameters during a boost operation of the circuit;

FIG. 6A to FIG. 6F are diagrams showing respective parameters during a buck operation of the circuit;

DETAILED DESCRIPTION

Hereinafter, embodiments of the present disclosure will be described with reference to the drawings. In the following embodiments, the same reference symbols are designated to components which are the same or equivalent and the description of the same component will be omitted.

First Embodiment

Hereinafter, a first embodiment of the present disclosure will be described with reference to FIG. 1 to FIG. 16.

In recent years, as a rise of environmental awareness, an electric car and a hybrid car are being spread widely. A drive system of each of the vehicles includes an inverter for driving a motor and a battery for supplying power to the inverter. In this case, a proper value of a voltage supplied to the inverter varies according to the travel state (travel speed) of the vehicle. Consequently, many drive systems have a switching power supply device including a bidirectional chopper between the battery and the inverter. With such a configuration, battery voltage is boosted to a proper voltage value for supplying the boosted battery voltage to the inverter, and power (regenerative power) generated by the motor is decreased to the battery voltage during the deceleration of the vehicle to charge the battery.

Figure 1:
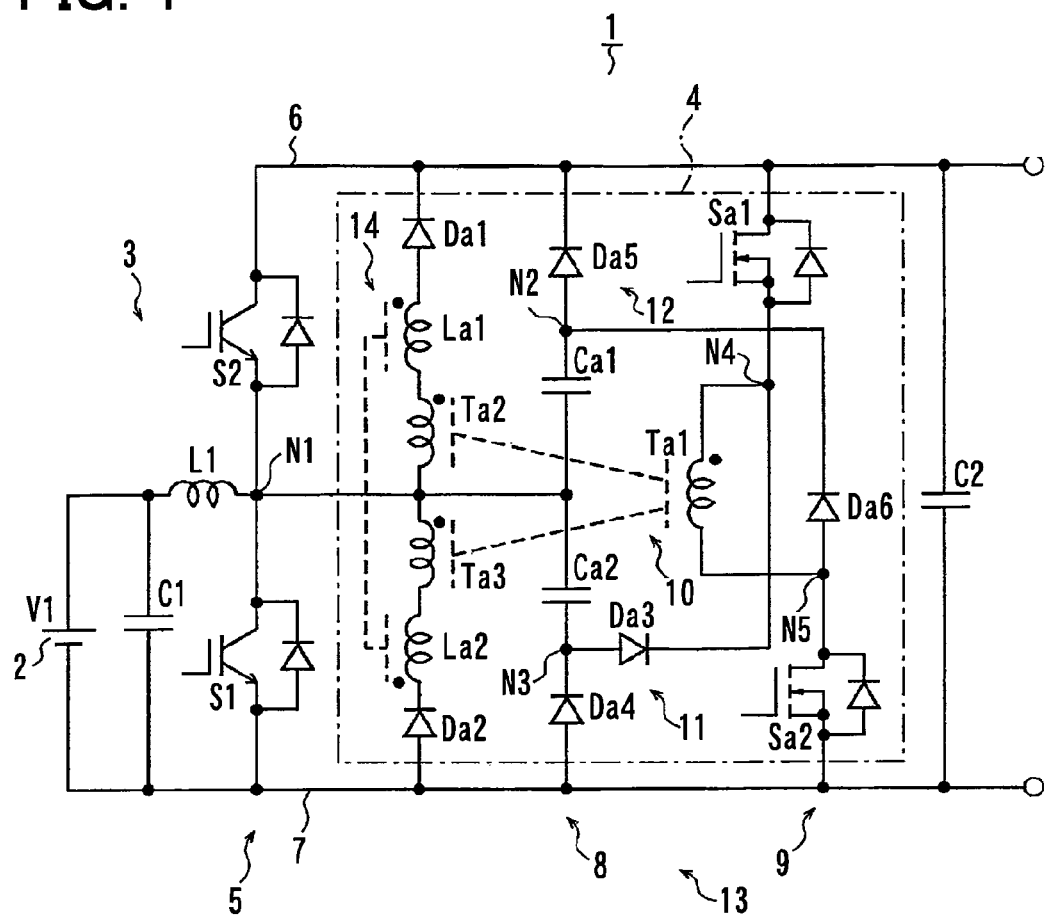
FIG. 1 is a circuit diagram showing a configuration of a switching power supply device according to a first embodiment of the present disclosure.

A switching power supply device 1 to which a power conversion device according to the present disclosure is applied is used in such a drive system of a vehicle. The switching power supply device 1 performs a boost operation for increasing a direct current (DC) voltage supplied from a DC power supply 2, which is provided by the battery. The switching power supply device 1 performs a buck operation for decreasing a power regenerated by the inverter via an output terminal. As shown in FIG. 1, the switching power supply device 1 includes a bidirectional chopper 3, a loss reduction circuit 4, capacitors C1 and C2, and the like.

The bidirectional chopper 3 includes a main series circuit 5 and a reactor L1. The main series circuit 5 includes two switching elements S1 and S2, which are connected in series. The switching elements S1 and S2 correspond to conduction control elements, and provided by, for example, IGBTs. A driving of the switching elements S1 and S2 is controlled by a control unit (not shown). A collector of the switching element S2, which corresponds to a main terminal, is connected to a high-potential-side output terminal of the switching power supply device 1 via a power supply line 6. An emitter of the switching element S1, which corresponds to a main terminal, is connected to a low-potential-side output terminal of the switching power supply device 1 and a low-potential-side terminal of the DC power supply 2 via a power supply line 7. The components configuring the circuit are also referred to as circuit elements.

The reactor L1, which corresponds to a main inductance element, is connected between a high-potential-side terminal of the DC power supply 2 and a node N1. The node N1 between a collector of the switching element S1 and an emitter of the switching element S2 is a common connection point of the main series circuit 5. The capacitor C1 on the input side is connected between the terminals of the DC power supply 2. The capacitor C2 on the output side is connected between the power supply lines 6 and 7. That is, the capacitor C2 is connected between the terminals of the main series circuit 5.

The loss reduction circuit 4 includes auxiliary series circuits 8 and 9, capacitors Ca1 and Ca2, a transformer 10, diodes Da1 and Da2, reactors La1 and La2, and the like. The auxiliary series circuits 8 and 9 are provided in parallel to the main series circuit 5.

The auxiliary series circuit 8 is a series circuit of a switching element Sa1, which corresponds to a first auxiliary switching element and is disposed on the high-potential side, and a first rectifying unit 11 disposed on the low-potential side. The switching element Sa1 is provided by, for example, an N-channel-type MOSFET and is driven by a non-illustrated control unit. The first rectifying unit 11 includes two diodes Da3 and Da4, which correspond to rectifying elements and are connected in series. Anodes of the diodes Da3 and Da4 are connected to the power supply line 7 side. That is, the diodes Da3 and Da4 are configured to check a path of power from the high-potential side of the main series circuit 5 to the low-potential side of the main series circuit 5. That is, the diodes Da3 and Da4 checks short-circuit between the power supply lines 6 and 7.

The auxiliary series circuit 9 is a series circuit of a second rectifying unit 12 disposed on the high-potential side and a switching element Sa2, which corresponds to a second auxiliary switching element and is disposed on the low-potential side. The second rectifying unit 12 includes diodes Da5 and Da6, which corresponding to rectifying elements and are connected in series. Similar to the diodes Da3 and Da4, the diodes Da5 and Da6 check path of power from the high-potential side to the low-potential side of the main series circuit 5. The switching element Sa2 is provided by, for example, an N-channel-type MOSFET and is driven by a non-illustrated control unit. In the present embodiment, the auxiliary series circuits 8 and 9 configure an auxiliary switching unit 13.

The capacitor Ca1, which corresponds to an electricity storage element, is connected between a node N2, which is a common connection point of the diodes Da5 and Da6, and the node N1. The capacitor Ca2, which corresponds to an electricity storage element, is connected between a node N3, which is a common connection point of the diodes Da3 and Da4, and the node N1. A transformer 10 includes a primary winding Ta1 and two secondary windings Ta2 and Ta3. The number of turns of the primary winding Ta1 is larger than the number of turns of the secondary windings Ta2 and Ta3. The reactors La1 and La2, which correspond to auxiliary inductance elements, are configured as a coupled inductor 14 which is magnetically coupled.

The primary winding Ta1 of the transformer 10 is connected between a node N4, which is a common connection point of the auxiliary series circuit 8, and a node N5, which is a common connection point of the auxiliary series circuit 9, and a winding start of the primary winding Ta1 is connected to the node N4. That is, the primary winding Ta1 is connected in parallel to the main series circuit 5 via the switching elements Sa1 and Sat. The diode Da1, which corresponds to a rectifying unit, the reactor La1, and the secondary winding Ta2 of the transformer 10 are connected in series in the described order between the power supply line 6 and the node N1. That is, the diode Da1, the reactor La1, and the secondary winding Ta2 are connected in series between two main terminals of the switching element S2. A cathode of the diode Da1 is connected to the power supply line 6. Winding starts of the reactor La1 and the secondary winding Ta2 are connected to is the power supply line 6 side.

The secondary winding Ta3 of the transformer 10, the reactor La2, and the diode Da2, which corresponds to a rectifying unit, are connected in series in the described order between the node N1 and the power supply line 7. That is, the secondary winding Ta3, the reactor La2, and the diode Da2 are connected in series between two main terminals of the switching element S1. In this case, a winding start of the secondary winding Ta3 is connected to node N1 side. The reactor La2 is connected so that the power supply line 7 side is the winding start. An anode of the diode Da2 is connected to the power supply line 7 side.

In above-described connection state, when voltage is applied to the primary winding Ta1 of the transformer 10, voltage is induced in the secondary winding Ta2 from the emitter of the switching element S2, which is also equivalent to the main terminal on the low-potential side, toward the collector of the switching element S2, which is also equivalent to the main terminal on the high-potential side. Further, voltage is induced in the secondary winding Ta3 from the emitter of the switching element S1 toward the collector of the switching element S1. When voltage is applied so that the potential on the node N1 side is high than the other side in each of the reactors La1 and La2, induction motive power is generated to make the potential on the node N1 side is higher than the other side of each reactor. Each of the diodes Da1 and Da2 checks path of power from the high potential side to the low potential side in the main series circuit 5. That is, each of the diodes Da1 and Da2 checks short-circuit between the power supply lines 6 and 7.

The following will describe an action of the above-described configuration.

One cycle of voltage boost operation of the switching power supply device 1 can be divided into six periods M1 to M6 as illustrated in FIG. 2A to FIG. 2F. The following will describe the circuit operations during each period.

The following will describe a voltage boost operation during period M1.

Figure 3A:
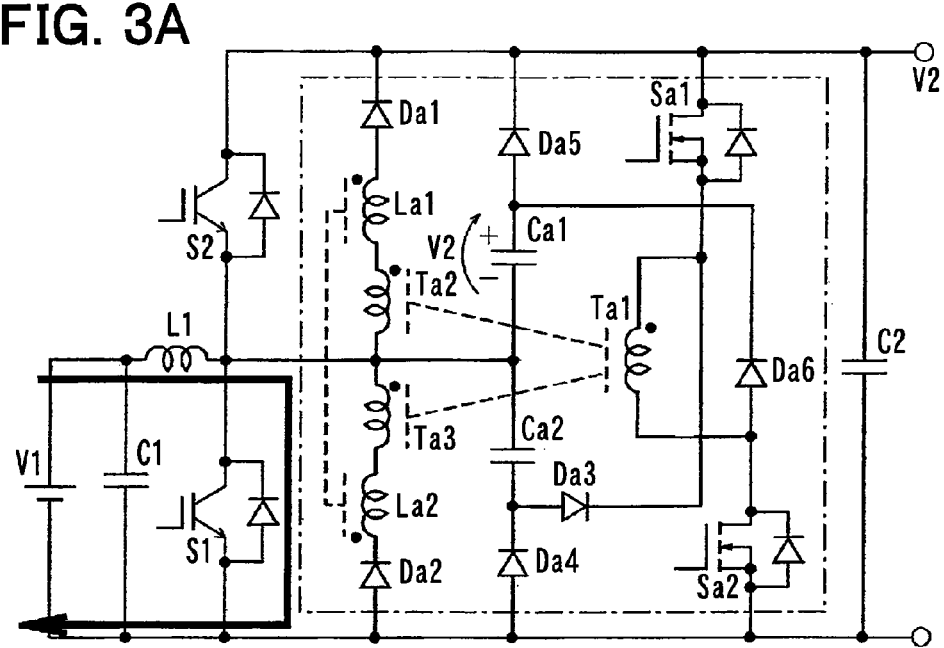
FIG. 3A is a diagram showing a current flow during a period M1 and FIG. 3B is a diagram showing a current flow during a period M2 during the boost operation.

During period M1, the switching element S1 is in on state. As illustrated in FIG. 3A, current flows through DC power supply 2, reactor L1, switching element S1, and DC power supply 2 in described order as a current path, and magnetic energy is accumulated (charged) in the reactor L1. That is, the period M1 is the same as an on period in a configuration, which has no loss reduction circuit. The current IL1 flowing through the reactor is shown in FIG. 2A. The current ITa2 flowing through the secondary winding Ta2, the current ILa1 flowing through the reactor La1, and the current ITa1 flowing through the primary winding Ta1 are shown in FIG. 2D. Hereinafter, the configuration without loss reduction circuit is also referred to as a related art. During period M1, the switching elements S2, Sa1, and Sa2 are in off state. The capacitor Ca1 is charged during the period M6, and an output voltage Vca1 of the capacitor Ca1 becomes to a voltage value V2 as shown in FIG. 2C.

The following will describe the voltage boost operation during period M2.

Figure 3B:
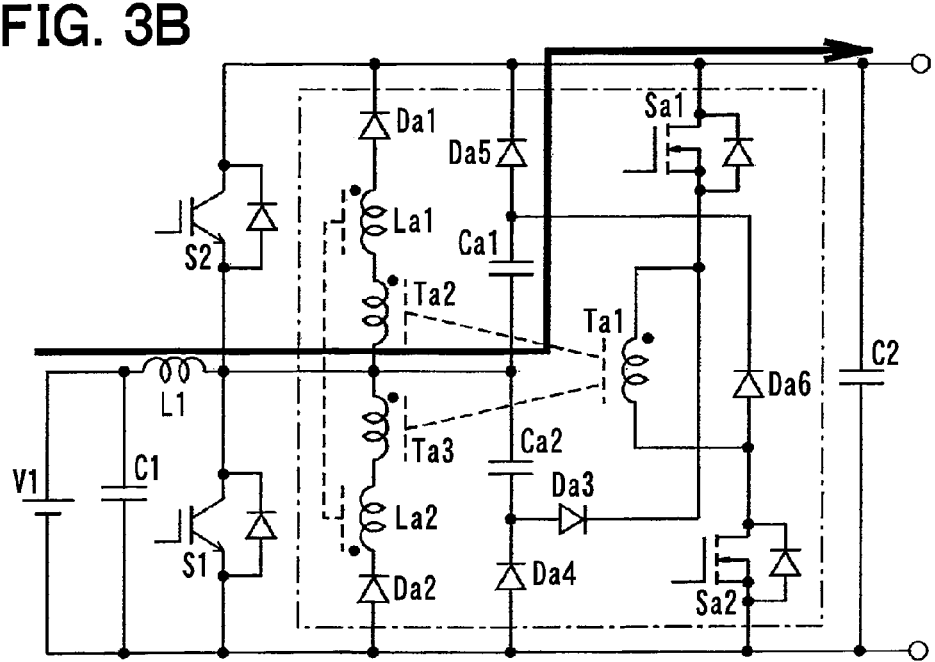

Period M2 is a discharge period of the capacitor Ca1 after a turning off the switching element S1. As illustrated in FIG. 3B, immediately after the switching element S1 is turned off, current in the reactor L1 flows to the output terminal of the switching power supply device 1 via the capacitor Ca1 and the diode Da5. During period M2, the electrostatic capacitance accumulated in the capacitor Ca1 is discharged so as to be regenerated on the output terminal side, and the voltage Vice between the collector and the emitter of the switching element S1 (voltage gradient between collector and emitter) changes smoothly as shown in FIG. 2B. As a result, a switching loss during the turn-off is reduced.

The following will describe a reason why back-flow current does not flow in the path via the switching element S2 during the period M2. When the switching element S1 is turned off, the voltage at the common connection point of the switching elements S1 and S2 gradually rises from zero. At this time, the capacitor Ca1 is already charged to the output voltage V2 during the period M6. Consequently, until discharge of the capacitor Ca1 is finished, a reverse voltage is applied to the switching element S2 via the diode Da5. Therefore, during the period M2, the current of the reactor L1 does not flow in the path via the switching element S2 but flows in the path of the capacitor Ca1, and the accumulated electrostatic capacitance of capacitor Ca1 is discharged.

The following will describe the voltage boost operation during period M3.

Figure 4A:
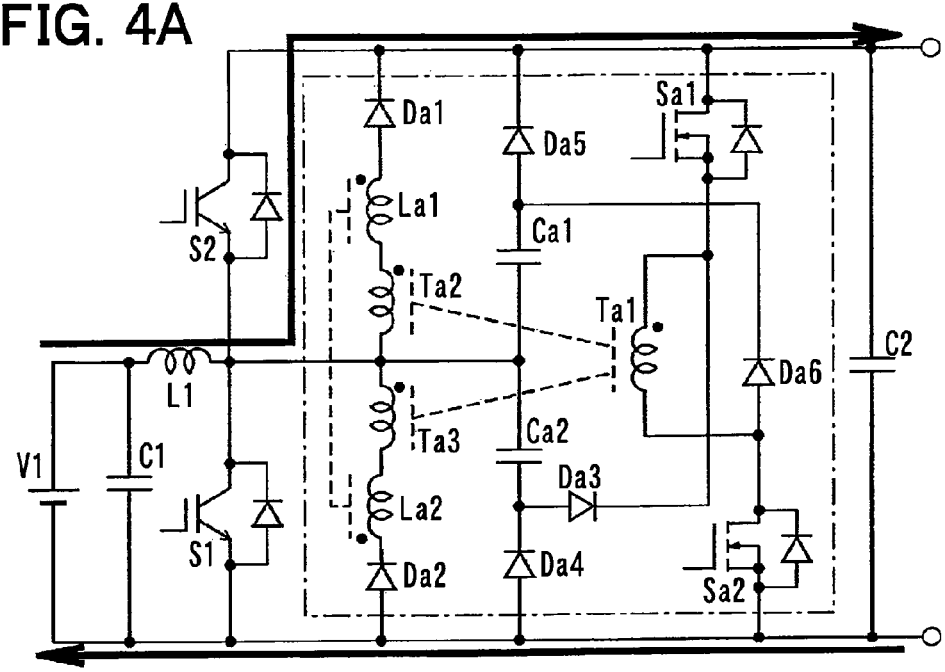
FIG. 4A is a diagram showing a current flow during a period M3 and FIG. 4B is a diagram showing a current flow during a period M4 during the boost operation.

When the discharge of the capacitor Ca1 is finished, as illustrated in FIG. 4A, the current of the reactor L1 flows to the output terminal side via the switching element S2, specifically via a freewheel diode of the switching element S2. That is, the period M3 is the same as an off period in the related art.

The following will describe the voltage boost operation during period M4.

Figure 4B:
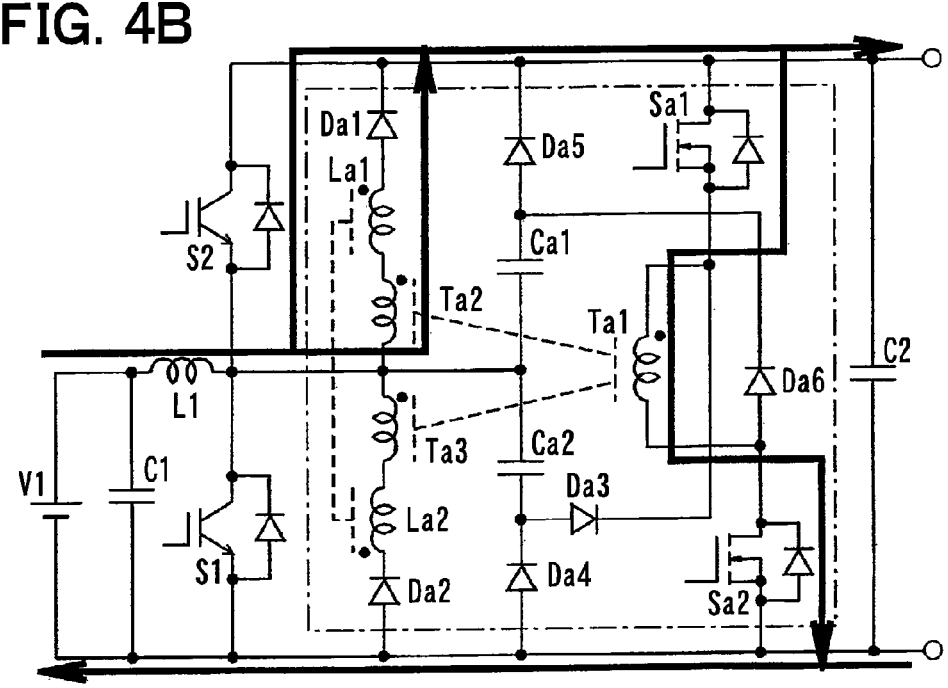

This is a preparation period before the turning on of the switching element S1, and the switching elements Sa1 and Sa2 are turned on at a start time of the period M4 as shown in FIG. 2F. As shown in FIG. 4B, the current flowing through the reactor L1 flows through secondary winding Ta2, reactor La1, diode Da1 in described order, instead of flowing through the switching element S2. The following will describe a mechanism of the current flow change. When the switching elements Sa1 and Sa2 are turned on, the output voltage V2 is applied to the primary winding Ta1 and current flows through the primary winding Ta1. As a result, induction power is generated in the secondary winding Ta2 and current flowing through the reactor L1 changes a path to the above-described current path including secondary winding Ta2, reactor La1, diode Da1 in described order.

The following will describe a reason why current does not flow in the path via the secondary winding Ta3 and the reactor La1 during the period M4. During the period M4, the voltage at the common connection point of the switching elements S1 and S2 is almost fixed to the output voltage V2. On the other hand, the anode of the diode Da2 is connected to the power supply line 7 (0V). Since the number of turns of the secondary windings Ta2 and Ta3 is smaller than the number of turns of the primary winding Ta1 in the transformer 10, even when the output voltage V2 is applied to the primary winding Ta1, the induction voltage in the secondary winding Ta3 is smaller than the output voltage V2. Consequently, the diode Da2 is in a reverse bias state. Therefore, by the rectifying action of the diode Da2, current does not flow in the path via the secondary winding Ta3 and the reactor La2 during the period M4.

The following will describe the voltage boost operation during period M5.

Figure 5A:
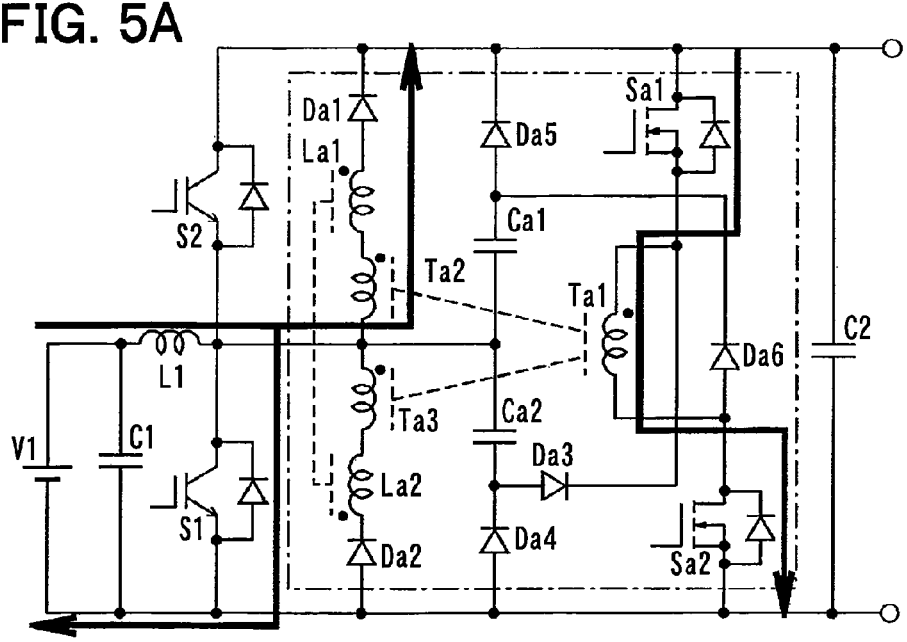
FIG. 5A is a diagram showing a current flow during a period M5 and FIG. 5B is a diagram showing a current flow during a period M6 during the boost operation.

When the current in the reactor L1 flows through the secondary winding Ta2 and the reactor La1, the switching element S1 is turned on as shown in FIG. 2E. As shown in FIG. 5A, the flow of current changes to the path including the switching element S1. At this time, in the current path including the reactor L1, parasitic inductances of the reactor La1 and the secondary winding Ta2 exist as an inductance component. Consequently, even when the switching element S1 is turned on, the flow of current does not change immediately toward the switching element S1. Therefore, an increasing speed of the collector current Ic of the switching element S1 during the period M5 is suppressed as shown in FIG. 2B, and the switching loss during the turn-on of the switching element S1 is reduced.

The following will describe a reason why current does not flow in the path including the secondary winding Ta3 and the reactor La2 during the period M5. During the period M5, the common connection point of the switching elements S1 and S2 is fixed to the potential of the power supply line 7, which is equal to 0V, corresponding to the turn-on of the switching element S1. On the other hand, the diode Da1 is turned on. As described above, the induction voltage in the secondary winding Ta2 is smaller than the output voltage V2. Thus, a voltage which makes the power supply line 6 side high is applied to the reactor La1. On the other hand, although a voltage which makes the potential on the power supply line 7 side low is induced in the secondary winding Ta3, a voltage which makes the power supply line 7 side high is induced instead in the reactor La2. Consequently, by designing so that the induction voltage of the reactor La2 is higher than induction voltage of the secondary winding Ta3, reverse bias can be applied to the diode Da2 during the period M5. At this time, although current flows in the path including the secondary winding Ta2 and the reactor La1, no current flows in the path including the secondary winding Ta3 and the reactor La2.

The period M5 is much shorter than the period M4 as shown in FIG. 2A to FIG. 2F for the following reason. As described above, the turn ratio of the transformer 10 is set so that the number of turns of Ta1 is larger than the number of turns of Ta2. With this configuration, the electromotive force induced in the secondary winding Ta2 during the period M4 is low. Therefore, during the period M4, the current flow change needs a relatively long time. On the other hand, during the period M5, when the switching element S1 is turned on, large reverse voltage is applied to the reactor La1. Thus, the current flow change to the path including the switching element S1 needs a shorter time than the necessary time of the current flow change during the period M4. Consequently, the period M5 usually is much shorter than the period M4.

The following will describe the voltage boost operation during period M6.

Figure 5B:
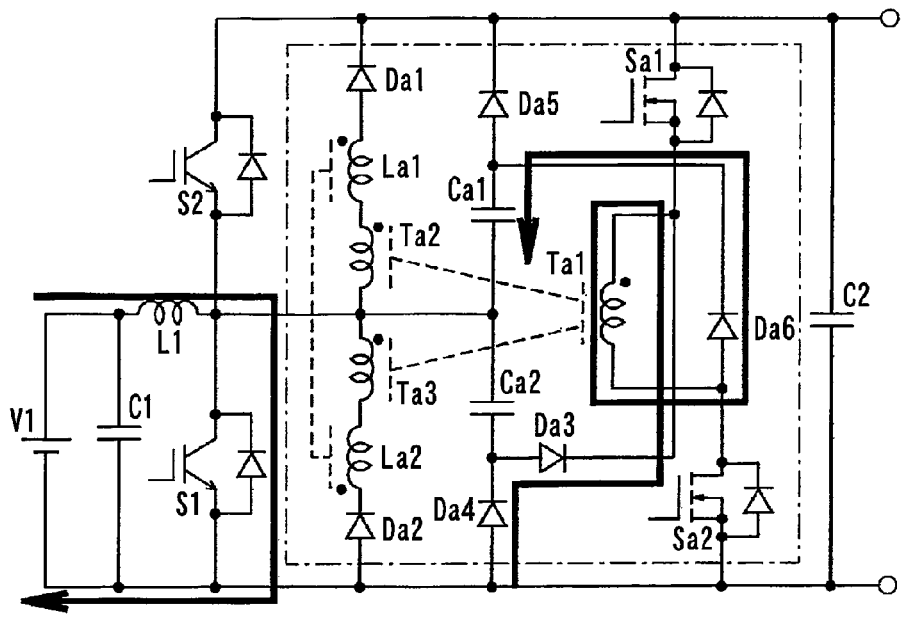

After the switching element S1 is turned on, the switching elements Sa1 and Sa2 are turned off at an end time of the period M6 as shown in FIG. 2E and FIG. 2F. As shown in FIG. 5B, current flows in a path through diode Da4, diode Da3, primary winding Ta1, diode Da6, capacitor Ca1 in described order driven by the magnetic energy accumulated in the primary winding Ta1. Further, charging is performed in the capacitor Ca1 until the terminal voltage Vca1 of the capacitor Ca1 increases to the output voltage V2. When the magnetic energy remains in the primary winding Ta1 at the time point when the charging is finished, current flows to the output side via the diodes Da6 and Da5. After that, the operation returns to the period M1.

One cycle of the voltage buck operation of the switching power supply device 1 can be divided into six periods M1 to M6 as illustrated in FIG. 6A to FIG. 6F. The following will describe circuit operations in each of the periods M7 to M12.

The following will describe a voltage buck operation during period M7.

Figure 7A:
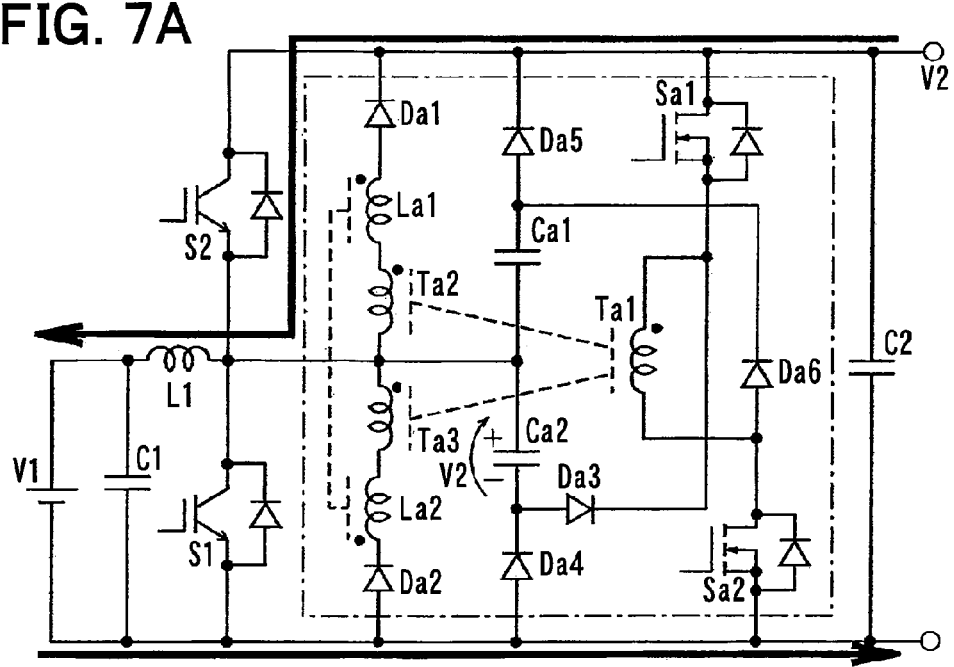
FIG. 7A is a diagram showing a current flow during a period M7 and FIG. 7B is a diagram showing a current flow during a period M8 during the buck operation.

During the period M7, the switching element S2 is in on state, and as illustrated in FIG. 7A, current flows in a path of high-potential-side output terminal, switching element S2, reactor L1, DC power supply 2, reactor L1, DC power supply 2, low-potential-side output terminal in described order, and magnetic energy is accumulated (charged) in the reactor L1. That is, the period M7 is the same as an on period in the related art. At this time, the switching elements S1, Sa1, and Sa2 are in off state. The capacitor Ca2 is charged to the output voltage V2 during the period M12 which will be described later, and an output voltage Vca2 of the capacitor Ca2 becomes to a voltage value V2 as shown in FIG. 6C. The current ITa3 flowing through the secondary winding Ta3, the current ILa2 flowing through the reactor La1, and the current ITa1 flowing through the primary winding Ta1 are shown in FIG. 6D.

The following will describe the voltage buck operation during period M8.

Figure 7B:
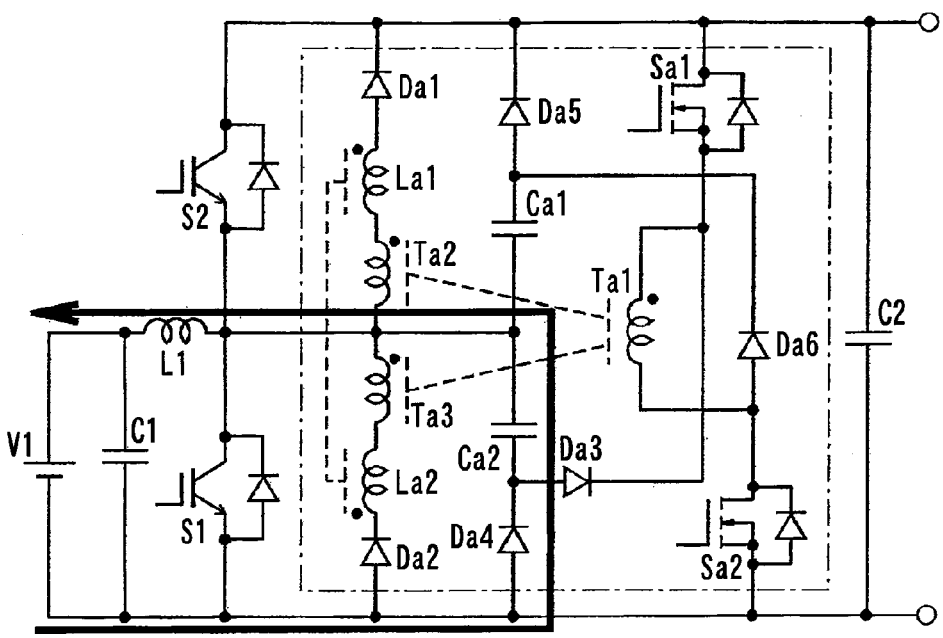
Figure 8A:
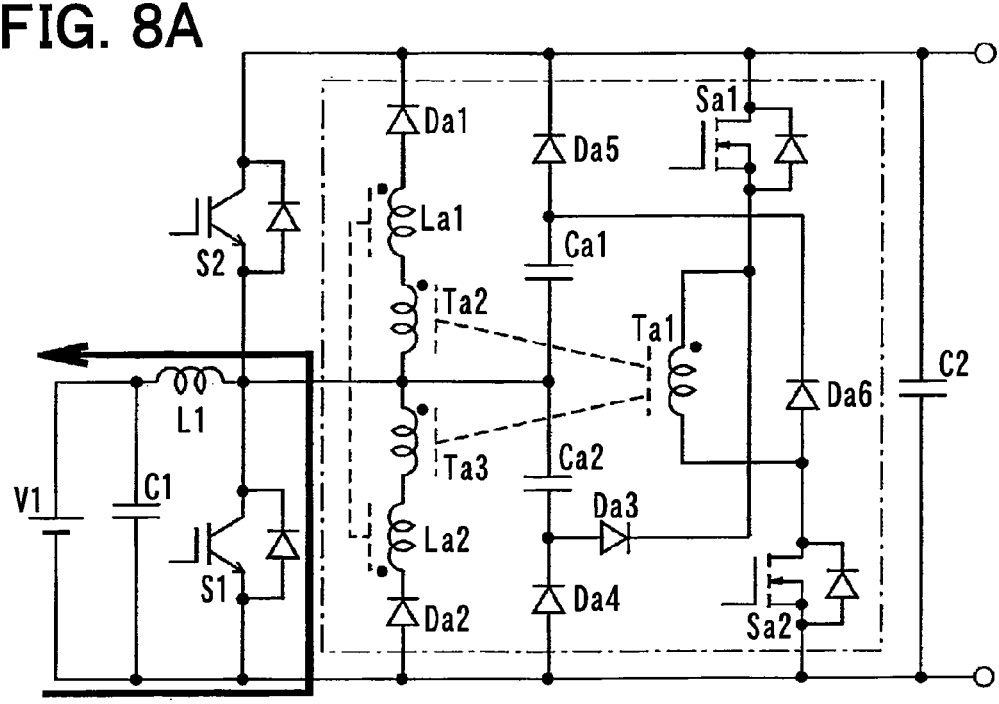
FIG. 8A is a diagram showing a current flow during a period M9 and FIG. 8B is a diagram showing a current flow during a period M10 during the buck operation.
Figure 8B:
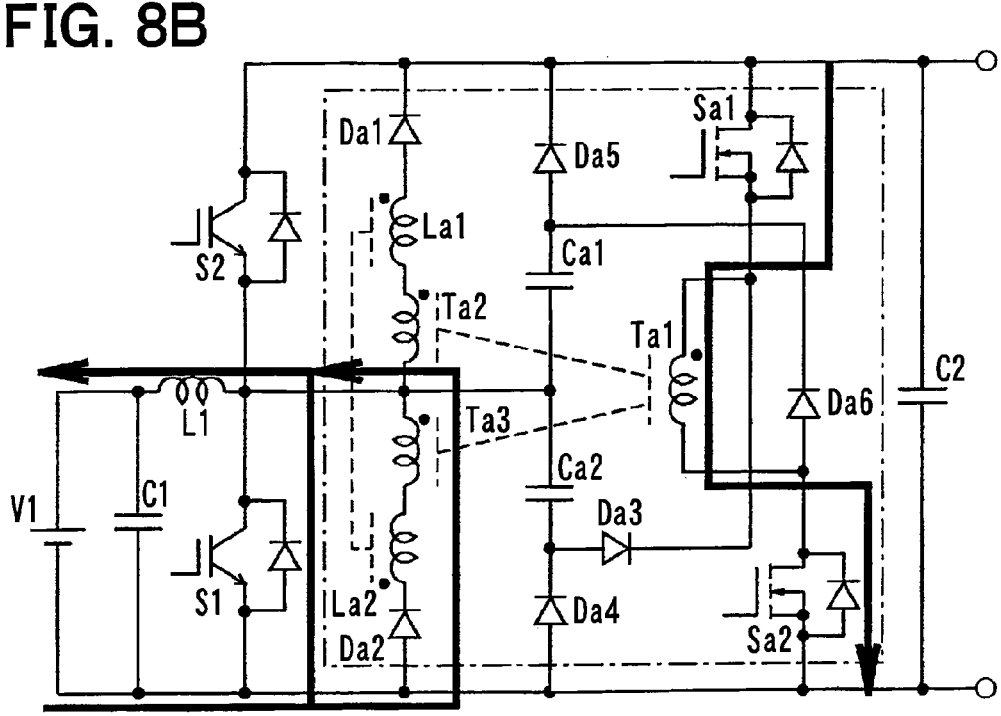

During the period M8, the capacitor Ca1 discharges the power after the switching element S2 is turned off. As illustrated in FIG. 7B, immediately after the switching element S2 is turned off, current IL1 in the reactor L1 flows toward the DC power supply 2 via the diode Da4 and the capacitor Ca2. At this time, the charges accumulated in the capacitor Ca2 are discharged so as to be regenerated on the DC power supply 2 side, and the voltage Vice between the collector and the emitter of the switching element S2 (voltage gradient between CE) changes smoothly as shown in FIG. 6B. As a result, a switching loss during the turn-off is reduced. The reason why back-flow current does not flow to the switching element S1 during the period M8 is similar to the reason described with respect to the period M2 in the voltage boost operation.

The following will describe the voltage buck operation during period M9.

Figure 9A:
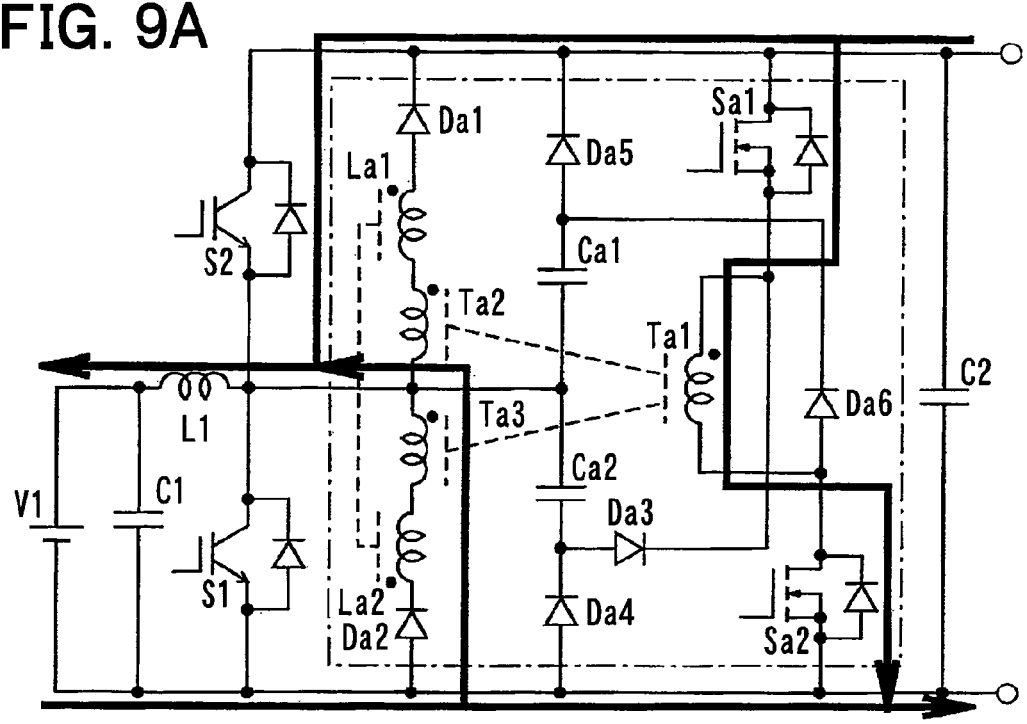
FIG. 9A is a diagram showing a current flow during a period M11 and FIG. 9B is a diagram showing a current flow during a period M12 during the buck operation.

When the discharge period of the capacitor Ca2 is finished, as illustrated in FIG. 9A, the current in the reactor L1 flows to the DC power supply 2 side via the switching element S1, specifically via a freewheel diode of the switching element S1. That is, the period M10 is the same as an off period in the related art.

The following will describe the voltage buck operation during period M10.

Figure 9B:
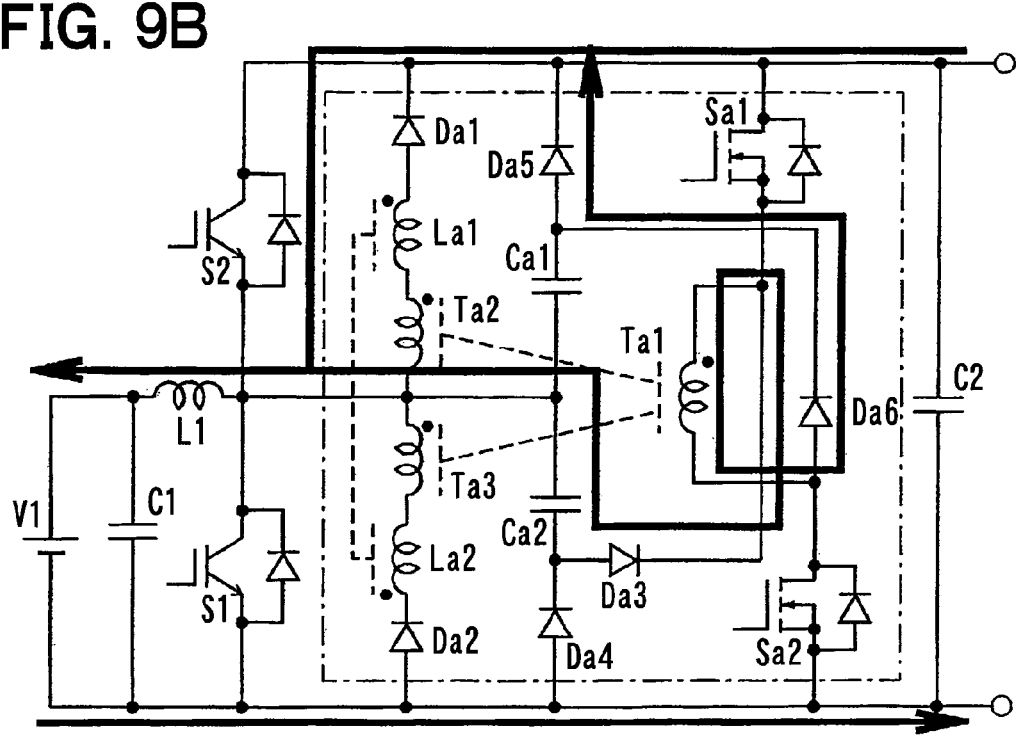

The period M10 is a preparation period before the switching element S2 is turned on, and the switching elements Sa1 and Sa2 are turned on at a start time of the period M10 as shown in FIG. 6F. As illustrated in FIG. 9B, the current in the reactor L1, which has flowed through the switching element S1, changes a current path, and flows through diode Da2, reactor La2, secondary winding Ta3 in described order. The mechanism of the current path change is similar to the current path change during the period M10 in the voltage boost operation. The reason that no current flows in the path including the reactor La1 and the secondary winding Ta2 during the period M4 is similar to that described with respect to the period M4 in the voltage boost operation.

The following will describe the voltage buck operation during period M11.

When the current in the reactor L1 changes the path to the reactor La2 and the secondary winding Ta3, the switching element S2 is turned on as shown in FIG. 6E. As illustrated in FIG. 9A, the current changes the path toward the switching element S2. At this time, in the path through which the current IL1 of the reactor L1 flows, parasitic inductance of the reactor La1 and the secondary winding Ta3 exists as an inductance component. Consequently, even when the switching element S2 is turned on, the flow of current IL1 does not change immediately toward the switching element S2 side. Therefore, a rising speed of the current IL1 is suppressed at the turn-on time of the switching element S2 as shown in FIG. 6B, and as a result, the switching loss during the turn-on is reduced. Accordingly, an increasing speed of the collector current Ic of the switching element S2 during the period M11 is suppressed as shown in FIG. 6B.

The reason that no current flows through the path including the reactor La1 and the secondary winding Tat during the period M11 is similar to that described with respect to the period M5 in the voltage boost operation. The period M11 in the buck operation is also usually shorter than the period M10 for a reason similar to a reason that the period M5 in the voltage boost operation is shorter than the period M4 in the boost operation (refer to FIG. 5A and FIG. 5B).

The following will describe the voltage buck operation during period M12.

After the switching element S2 is turned on, the switching elements Sa1 and Sa2 are turned off as shown in FIG. 6E and FIG. 6F. As illustrated in FIG. 9B, current flows through a path including capacitor Ca2, diode Da3, primary winding Ta1, diode Da6, diode Da5 in described order by the magnetic energy accumulated in the primary winding Ta1, and the capacitor Ca2 is charged until the terminal voltage Vca2 of the capacitor Ca2 becomes the output voltage V2. When the magnetic energy remains in the primary winding Ta1 at the time point when the charging is finished, current flows to the DC power supply 2 side through the diodes Da4 and Da3, the primary Ta1, the diodes Da6 and Da5, the switching element S2, and the reactor L1 in described order. Then, the operation returns to the period M7.

Figure 10:
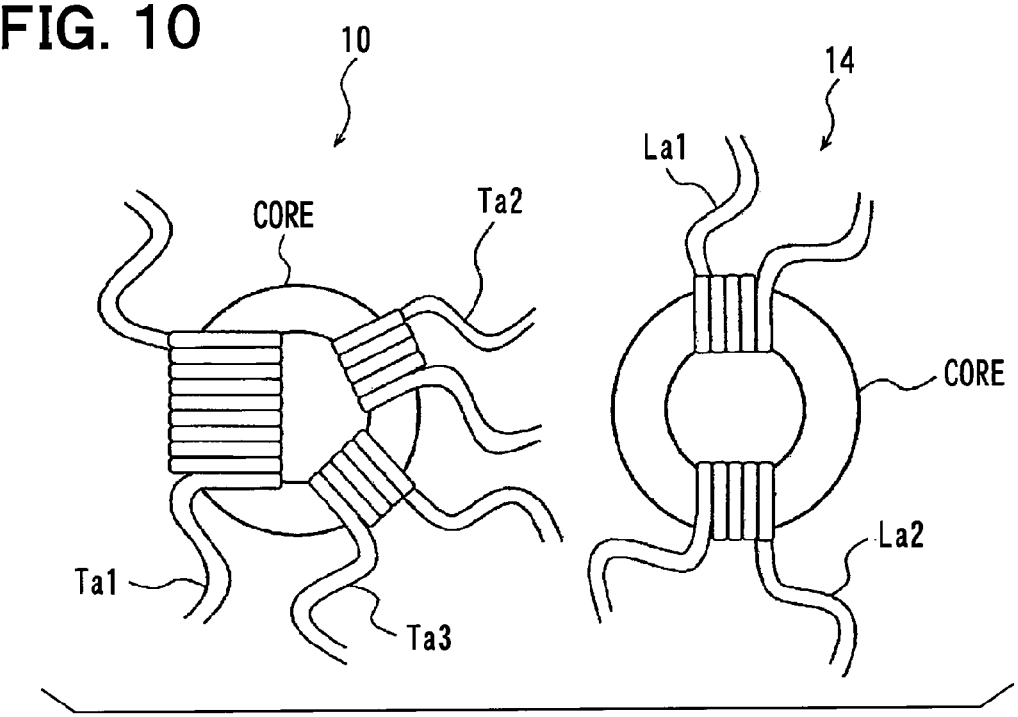
FIG. 10 is a diagram showing magnetic components included in a loss reduction circuit.

As described above, in the switching power supply device 1 of the present embodiment, a switching loss of the switching elements S1 and S2, which is included in the bidirectional chopper 3, is reduced during the time of turn-on and turn-off. Moreover, the magnetic components that are added in the loss reduction circuit 4 for reducing the switching loss include the transformer 10 and the coupled inductor 14, only two parts. In this case, as illustrated in FIG. 10, the transformer 10 and the coupled inductor 14 may be configured on respective magnetic cores. Therefore, in the present embodiment, the number of magnetic cores included in the loss reduction circuit 4 may be only two.

Figure 11:
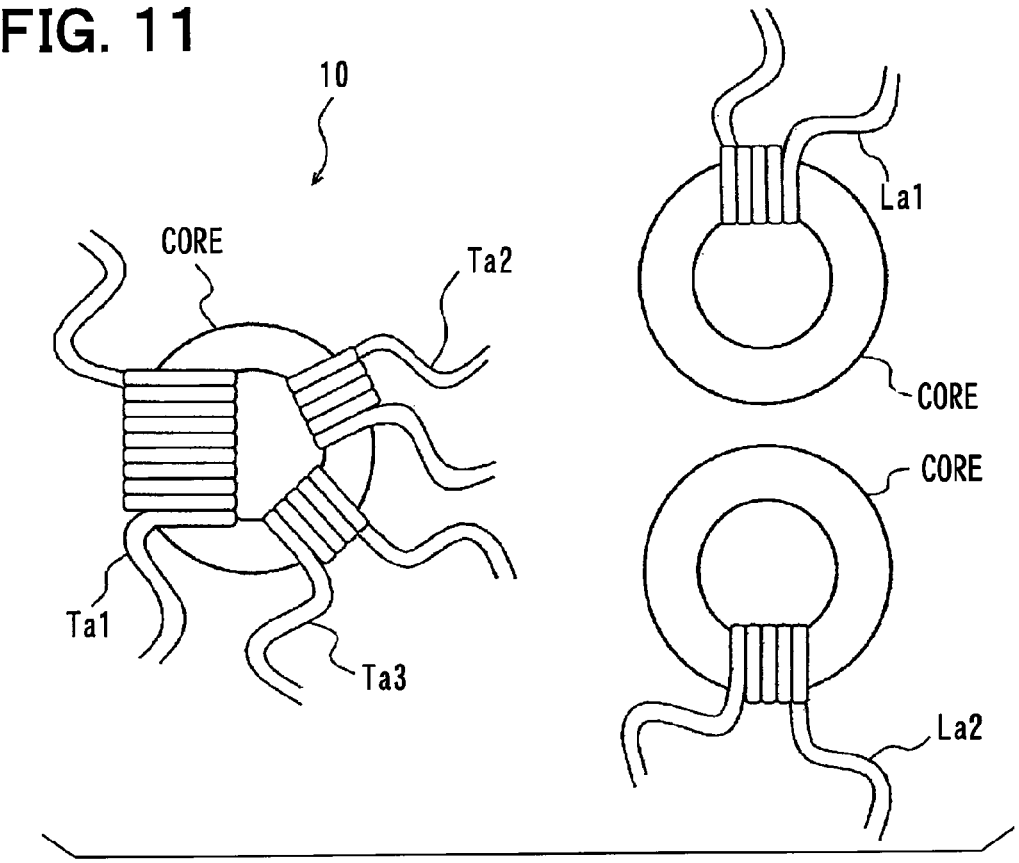
FIG. 11 is a diagram showing magnetic components included in a loss reduction circuit according to a first modification of the first embodiment.

On the other hand, in the configuration illustrated in FIG. 11 of JP 2012-110208 A, which is the related art, in order to reduce the switching loss in a bidirectional chopper, an auxiliary circuit is added in purpose of loss reduction. The auxiliary circuit includes two transformers and two sub-inductors, that is, magnetic components of the related art include four magnetic cores. That is, compared with the configuration of the related art, in the configuration of the present embodiment, the number of magnetic components (magnetic cores) included in the addition circuit (loss reduction circuit 4) for reducing the switching loss is reduced by half, and accordingly, a mounting area of the configuration of the present embodiment can be reduced. Therefore, according to the present embodiment, the switching loss can be reduced and increase in the constitution of the switching power supply device 1 can be suppressed.

In the present embodiment, the switching elements Sa1 and Sa2 are turned on before the turning on of the switching element S1 or S2 as shown in the period M4 and the period M11. Consequently, after the current of the reactor L1 flowing through the freewheel diode of one of the switching elements S1 or S2 is completely changed to the path including the secondary winding Ta2 and the reactor La1 or to the path including the secondary winding Ta3 and the reactor La2, the other one of the switching elements S1 or S2 is turned on. Thus, the turn-on loss is further reduced in the configuration according to the present embodiment.

In the transformer 10, the number of turns of the primary winding Ta1 is larger than each number of turns of the secondary winding Ta2 or Ta3. Consequently, by flowing relatively small current to the primary winding Ta1, relatively large current can be induced in the secondary windings Ta2 and Ta3. Therefore, the switching elements Sa1 and Sa2 interposed in the path of the current that flows through the primary winding Ta1 may be provided by a switching element having a lower rated current (for example, a small-sized high-speed switching element) compared with the switching elements S1 and S2. Thus, the size of the switching power supply device 1 can be further reduced.

The auxiliary switching unit 13 for applying the output voltage V2 to the primary winding Ta1 of the transformer 10 includes the auxiliary series circuit 8 and the auxiliary series circuit 9. The auxiliary series circuit 8 includes the switching element Sa1 and the first rectifying unit 11 connected in series, and the auxiliary series circuit 9 includes the second rectifying unit 12 and the switching element Sa2 connected in series. This configuration can prevent a problem which may occur in the case of employing, for example, a configuration including one switch connected in series with the primary winding Ta1 (such as the configuration of FIG. 14 which will be described later) is provided as the auxiliary switching unit.

When one switch is connected in series with the primary winding Ta1, during the switch is in on state, current flows in the primary winding Ta1. During the current flow, magnetic energy is accumulated in excitation inductance or parasitic inductance (leakage inductance) of the primary winding Ta1. When the switch is turned off in this state, a path for flowing current to the primary winding Ta1 disappears. However, the accumulated magnetic energy intends to continuously drive current to flow through the primary winding Ta1. Thus, a very high voltage is applied across terminals of the switch, and as a result, the switch may fail to properly operate or a performance of the switch may be deteriorated.

On the other hand, in the configuration of the present embodiment, even when the switching elements Sa1 and Sa2 (auxiliary switching unit 13) are turned off while a current is flowing through the primary winding Ta1, current can continuously flow to the primary winding Ta1 through the first and second rectifying units 11 and 12. At this time, the voltage across the terminals of each of the switching elements Sa1 and Sa2 is clamped to almost equal to the output voltage V2 by the diodes Da3 to Da6 included in the first and second rectifying units 11 and 12. Therefore, according to the present embodiment, occurrence of a problem such as operation failure or deterioration of the switching elements Sa1 and Sa2 caused by surge accompanying the turn-off of the auxiliary switching unit 13 can be prevented.

The reactor La1 is connected in series with the secondary winding Tat between the collector and the emitter of the switching element S2, and the reactor La2 is connected in series with the secondary winding Ta3 between the collector and the emitter of the switching element S1. That is, in the path to which the current of the reactor L1 is changed during the period M4, the reactors La1 and La2 exist in addition to the secondary windings Ta2 and Ta3. Consequently, during the period M5, the rising speed of the current during the turn-on of the switching elements S1 and S2 is further suppressed and the switching loss during the turn-on is further reduced.

The reactors La1 and La2 are magnetically coupled with each other as single coupled inductor 14. The reactors La1 and La2 are connected in such a manner that when voltage is applied to one of the reactors La1 or La2 so that the potential on the node N1 side becomes high, an induction power which makes the potential on the node N1 side becomes high is generated in the other reactor La1 or La2.

With this configuration, the current does not flow through the path including the secondary winding Ta3 and the reactor La2 during the period M5 in the voltage boost operation, and the current does not flow through the path including the secondary winding Ta2 and the reactor La1 during the period M12 in the buck operation. The current flowing through the path including the secondary winding Ta3 and the reactor La2 or the current flowing through the path including the secondary winding Ta2 and the reactor La1 contribute nothing to the switching loss reduction of the switching elements S1 and S2. Therefore, by preventing flow of such an unnecessary current, the power loss generated in the loss reduction circuit 4 is minimized and, as a result, the power conversion efficiency of the switching power supply device 1 can be prevented from being deteriorated. Herein, the unnecessary current means a current that contributes noting to the reduction of the switching loss.

The on state period of the switching elements Sa1 and Sa2 is set to a requisite minimum value by paying attention to the following points. When the current flowing in the reactor L1 becomes higher, the time necessary for changing the current path including the switching elements S1 and S2 to the current path including the secondary windings Ta2 and Ta3 becomes longer. When the output voltage V2 becomes higher, the voltage applied to the primary winding Ta1 becomes higher and time required for the above-described current path change becomes shorter. When the electrostatic capacitance of the capacitors Ca1 and Ca2 becomes larger, the on state period of the switching elements Sa1 and Sa2 need to be increased in order to store more electromagnetic energy in the primary winding Ta1.

The on state period of the switching elements Sa1 and Sa2 is set in accordance with at least one of the current flowing through the reactor L1 or the voltage value of the output voltage V2 (the voltage between the terminals of the main series circuit 5) so that the time required for the current path change is included within a range required under a specification. The on state period of the switching elements Sa1 and Sa2 is set in accordance with the electrostatic capacitance of the capacitor Ca1 so that charging can be performed to the capacitor Ca1 until the terminal voltage of the capacitor Ca1 becomes the output voltage V2 during the period M6. Similarly, the on state period of the switching elements Sa1 and Sa2 is set in accordance with the electrostatic capacitance of the capacitor Ca2 so that charging can be performed to the capacitor Ca2 until the terminal voltage of the capacitor Ca2 becomes the output voltage V2 during the period M12. By setting the on state period of the switching elements Sa1 and Sa2 to a requisite minimum value in above-described manner, on state period of the switching elements Sa1 and Sa2 can be shortened, and the loss generated in the loss reduction circuit 4 can be reduced to the minimum value. As a result, the power conversion efficiency of the switching power supply device 1 can be restricted from being deteriorated.

(First Modification)

The loss reduction circuit 4 of the switching power supply device 1 can be modified as follows. In the above-described embodiment, the reactors La1 and La2 are magnetically coupled with each other as single coupled inductor 14. As another example, the reactors La1 and La2 may be configured by using different magnetic cores as illustrated in FIG. 11, and the number of magnetic cores included in the loss reduction circuit 4 becomes three. However, in this case as well, the number of magnetic components (magnetic cores) in the addition circuit for reducing a switching loss is smaller than the number of magnetic components disclosed in the configuration of the related art. Consequently, the mounting area can be reduced compared with the related art. In this case, the above-described unnecessary current, which does not contribute to the switching loss, flows during the period M5. Thus, the power conversion efficiency may decrease by a slight level corresponding to the current. However, compared with the related art, the power conversion efficiency in this modification is higher than the power conversion efficiency in the related art.

(Second Modification)

As another example, at least one of the reactors La1 and La2 may be omitted from the loss reduction circuit 4. That is, one of the reactors La1, La2 or both the reactors La1, La2 may be omitted from the loss reduction circuit 4. The following will describe a second modification as an example with reference to FIG. 12. In circuit diagrams shown in FIG. 12 to FIG. 16, symbols of the switching elements S1, S2, Sa1, and Sa2 are drawn as normally-used symbols of switches for simplification.

Figure 12:
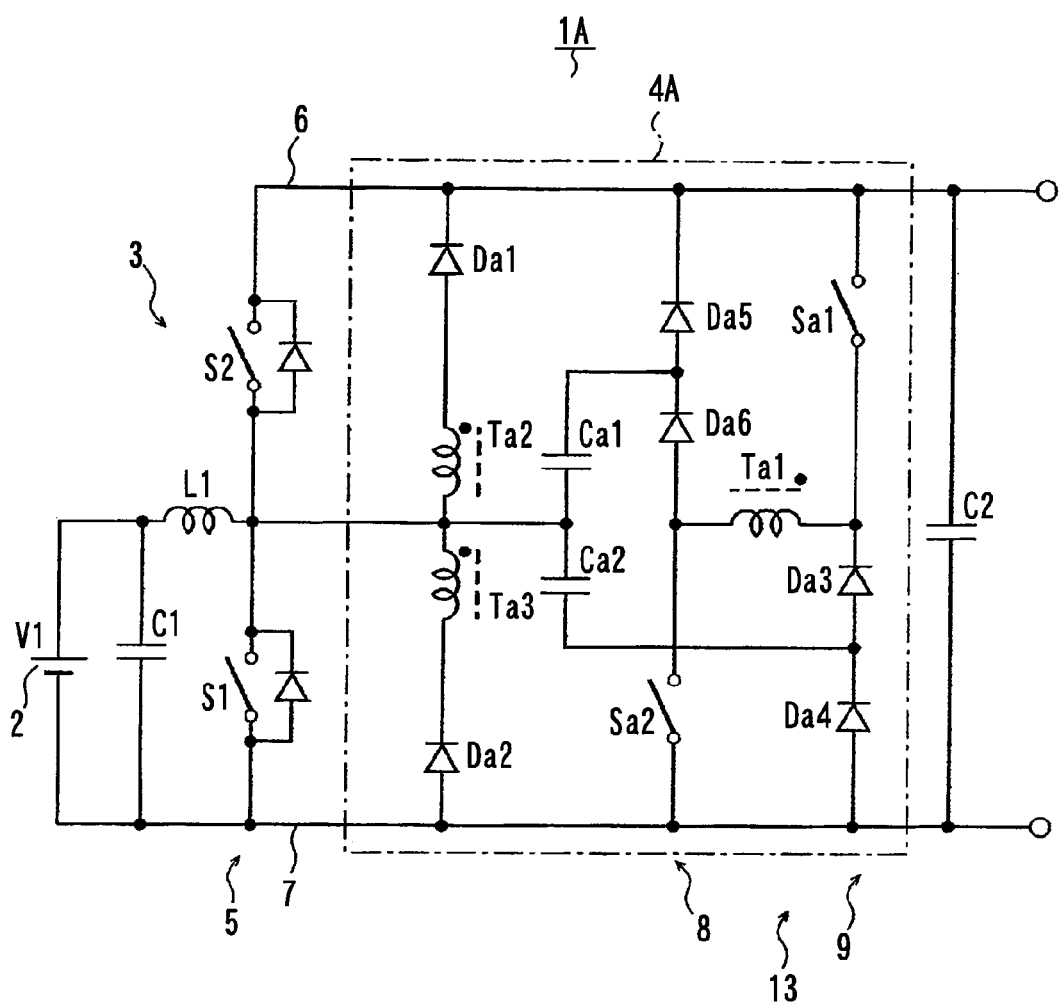
FIG. 12 is a circuit diagram showing a configuration of a switching power supply device according to a second modification of the first embodiment.

As shown in FIG. 12, a switching power supply device 1A includes a loss reduction circuit 4A which does not include the reactors La1 and La2 compared with the loss reduction circuit 4 according to the above embodiment as illustrated in FIG. 1. In this case, the current rising speed during a turning on of the switching elements S1 and S2 is limited only by the parasitic inductance component in the secondary windings Ta2 and Ta3 of the transformer 10. Therefore, during the turning on of the switching elements S1 and S2, the current rising speed may be less suppressed and the switching loss may be less reduced by an amount corresponding to the non-existing of the reactors La1 and La2. However, this modification provides the following advantages. In this modification, the number of the magnetic components (magnetic cores) included in the loss reduction circuit 4A is equal to only one (the transformer 10). Therefore, the mounting area of the addition circuit can be further reduced.

(Third Modification)

Figure 13:
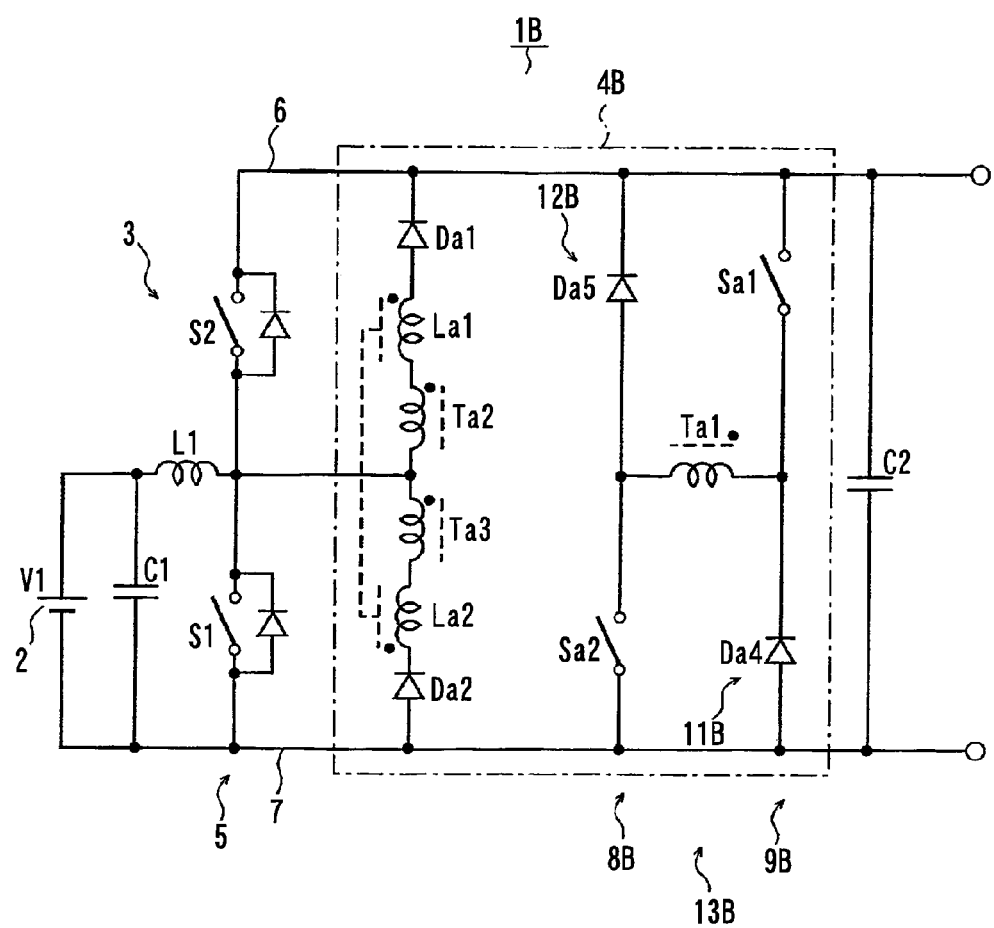
FIG. 13 is a circuit diagram showing a configuration of a switching power supply device according to a third modification of the first embodiment.

As another example, at least one of the capacitor Ca1 or the capacitor Ca2 may be omitted. That is, one of the capacitors Ca1, Ca2 or both the capacitors Ca1, Ca2 may be omitted. The following will describe a third modification as an example with reference to FIG. 13. As shown in FIG. 13, a switching power supply device 1B includes a loss reduction circuit 4B obtained by omitting the capacitors Ca1 and Ca2 from the loss reduction circuit 4 illustrated in FIG. 1. In this case, each of a first rectifying unit 11B and a second rectifying unit 12B may include one diode (Da4, Da5). In the case of such a configuration, although the effect of reducing a switching loss during the turn-off of the switching elements may deteriorate compared with above-described embodiment, a switching loss during the turn-on of switching element is reduced. Thus, a size of the switching power supply device 1B can be reduced and a total switching loss during turn-on and turn-off of the switching element can be reduced.

(Fourth Modification)

Figure 14:
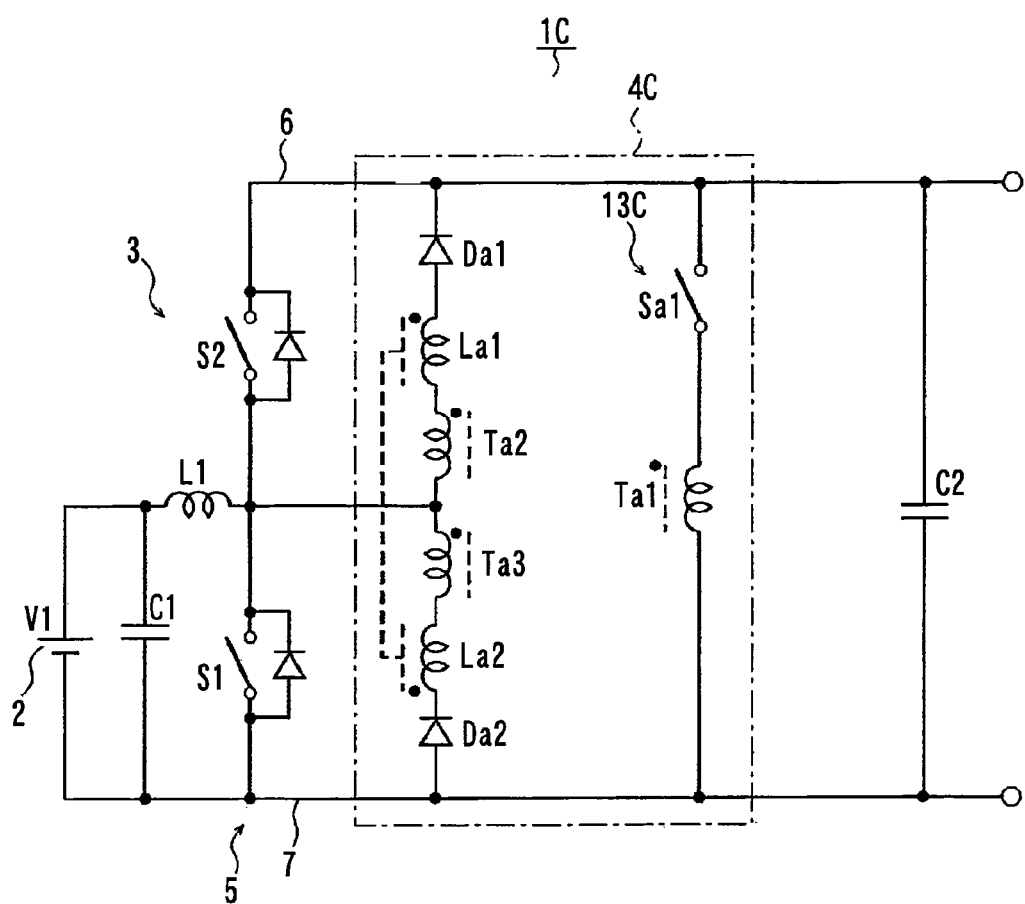
FIG. 14 is a circuit diagram showing a configuration of a switching power supply device according to a fourth modification of the first embodiment.

As another example, the first rectifying unit 11, the second rectifying unit 12, and one of the switching elements Sa1 and Sa2 may further be omitted based on the third modification. The following will describe a fourth modification as an example with reference to FIG. 14. As shown in FIG. 14, a switching power supply device 1C includes a loss reduction circuit 4C obtained by omitting the first rectifying unit 11B, the second rectifying unit 12B, and the switching element Sa2 from the loss reduction circuit 4B illustrated in FIG. 13. In this case, an auxiliary switching unit 13C includes one switching element Sa1 and the primary winding Ta1 connected in series.

With above configuration, a switching loss during the turn-on is reduced. Thus, a size of the switching power supply device 1C can be reduced together with a reduction of the switching loss. In this configuration, occurrence of a surge accompanying turn-off of the auxiliary switching unit 13C may not be suppressed. In order to suppress the surge current, a high-voltage switching element needs to be added as the switching element Sa1.

(Fifth Modification)

Figure 15:
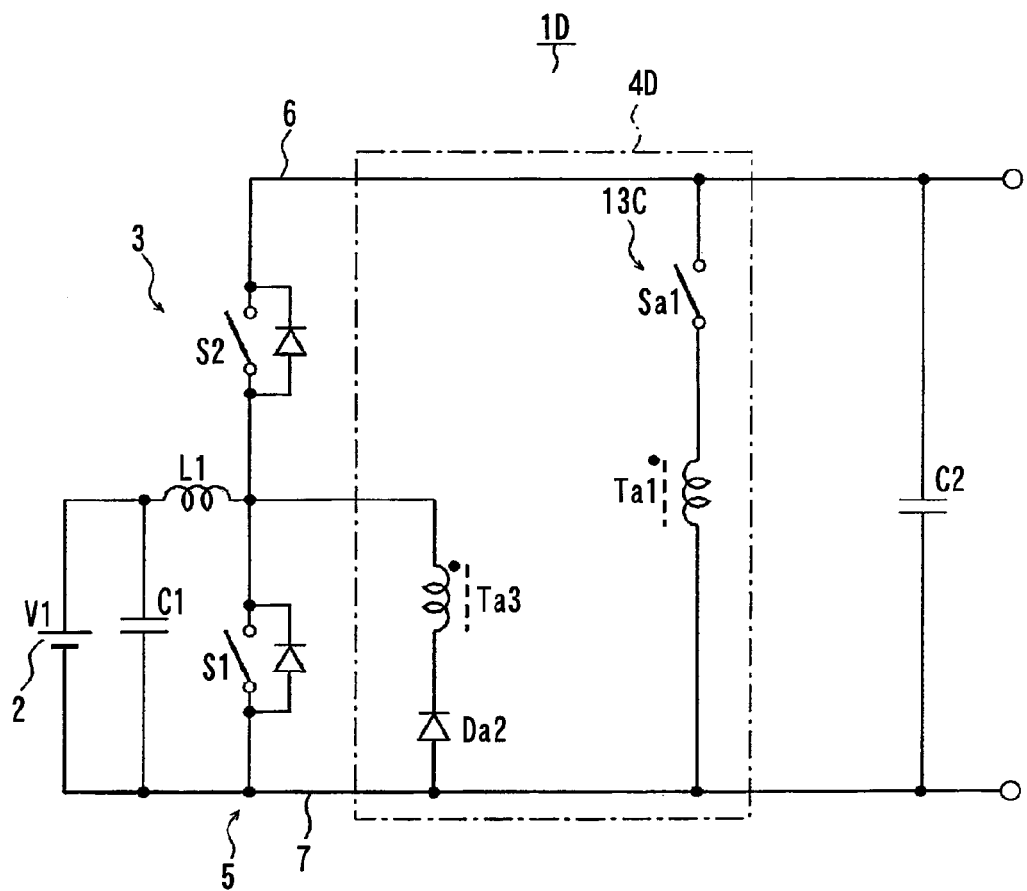
FIG. 15 is a circuit diagram showing a configuration of a switching power supply device according to a fifth modification of the first embodiment.

As another example, the diode Da1 and the secondary wiring Ta2 may further be omitted based on the fourth modification. The following will describe a fifth modification as an example with reference to FIG. 15. As shown in FIG. 15, a switching power supply device 1D includes a loss reduction circuit 4D obtained by omitting the diode Da1, the secondary winding Ta2, and the like from the loss reduction circuit 4C illustrated in FIG. 14. Also with such a configuration, a switching loss during the turn-on of the switching element S2 is reduced. Consequently, a size of the switching power supply device 1D can be further reduced together with a reduction of a switching loss.

(Sixth Modification)

Figure 16:
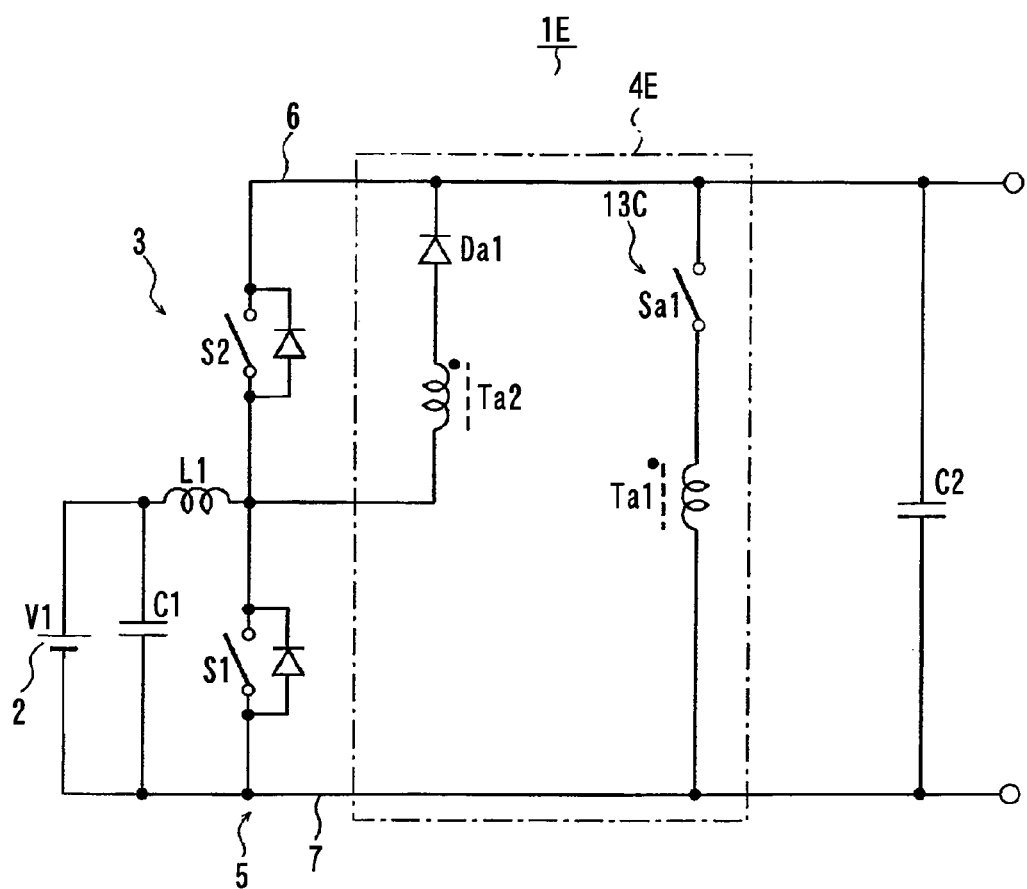
FIG. 16 is a circuit diagram showing a configuration of a switching power supply device according to a sixth modification of the first embodiment.

As another example, the secondary winding Ta3 and the diode Da2 may further be omitted based on the fourth modification. The following will describe a sixth modification as an example with reference to FIG. 16. As shown in FIG. 16, a switching power supply device 1E includes a loss reduction circuit 4E obtained by omitting the secondary winding Ta3, the diode Da2, and the like from the loss reduction circuit 4C illustrated in FIG. 14. Also with such a configuration, a switching loss during the turn-on of the switching element S1 is reduced. Thus, a size of the switching power supply device 1E can be further reduced together with a reduction of a switching loss.

Second Embodiment

The following will describe a second embodiment with reference to FIG. 17A to FIG. 23B. In the present embodiment, the magnetic core of the transformer 10 and the magnetic core of the coupled inductor 14 illustrated in FIG. 1 are integrally configured as one body.

Figure 17A:
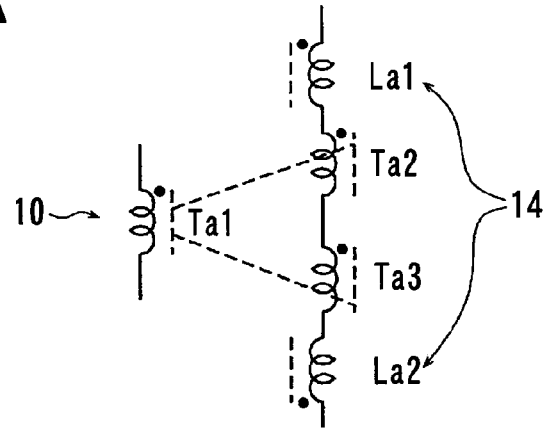
FIG. 17A is a diagram showing an electric configuration of magnetic components.
Figure 17B:
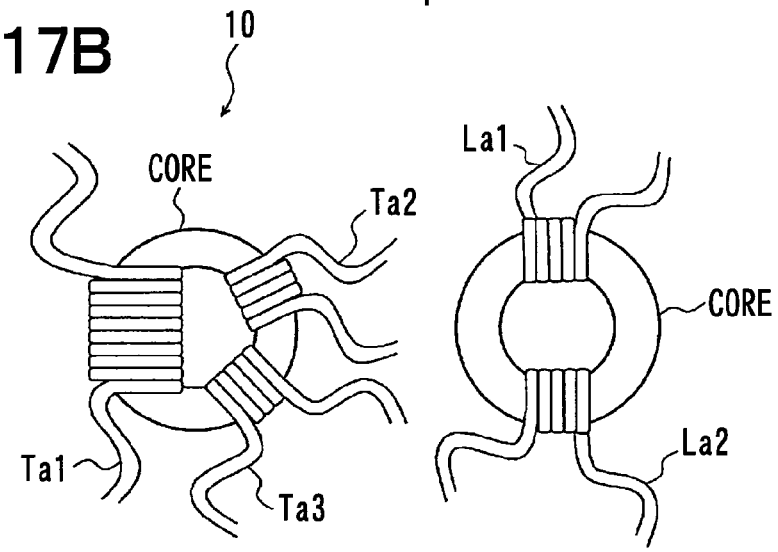
FIG. 17B is a diagram showing an exemplary configuration of magnetic component.
Figure 17C:
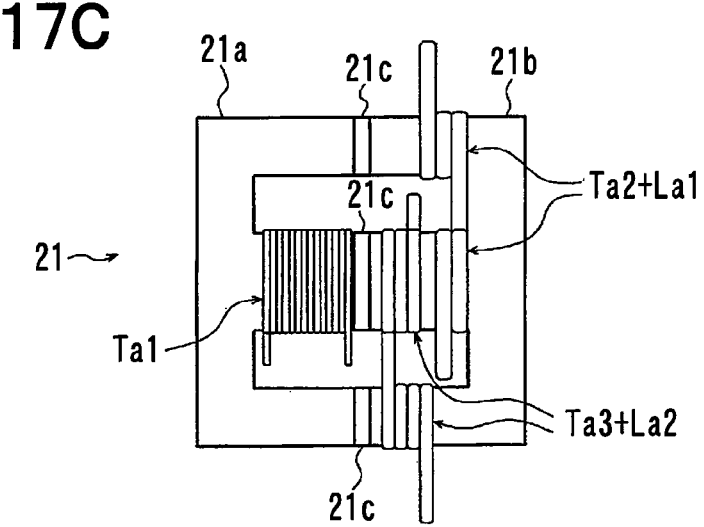
FIG. 17C is a diagram showing an exemplary configuration of magnetic components which have less number of magnetic cores according to a second embodiment of the present disclosure.

In the first embodiment, the transformer 10 and the coupled inductor 14 having the circuit configuration illustrated in FIG. 17A are configured by two separate magnetic cores as illustrated in FIG. 17B. In the present embodiment, the number of magnetic cores is reduced by integrating the transformer 10 and the coupled inductor 14 using, for example, an EE core unit 21 as illustrated in FIG. 17C. As illustrated in FIG. 17C, the EE core unit 21 includes two iron cores 21a and 21b, each having an E shape in cross section and an insulating member 21c that insulates the iron core 21a from the iron core 21b. The two iron cores 21a and 21b are arranged facing to each other. The configuration shown in FIG. 17C operate in a way similar to the configuration shown in FIG. 17B, and the following will describe details of the integration of the magnetic core of the transformer 10 with the magnetic core of the coupled inductor 14.

Figure 18A:
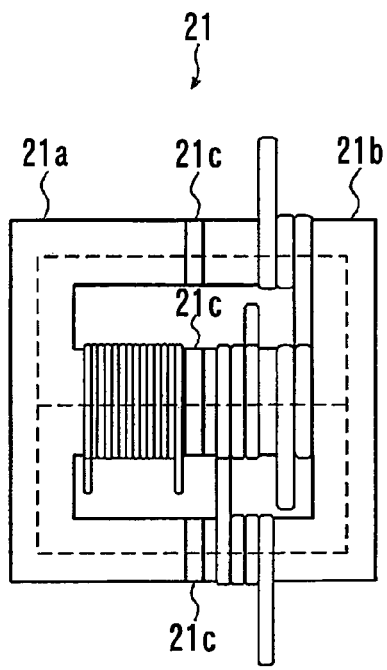
FIG. 18A is a diagram showing an integrated magnetic component and FIG. 18B is a diagram showing a magnetic path in the magnetic component shown in FIG. 18A.
Figure 18B:
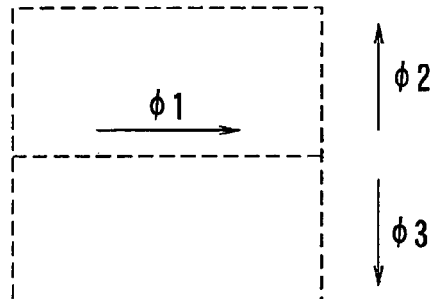
Figure 19:
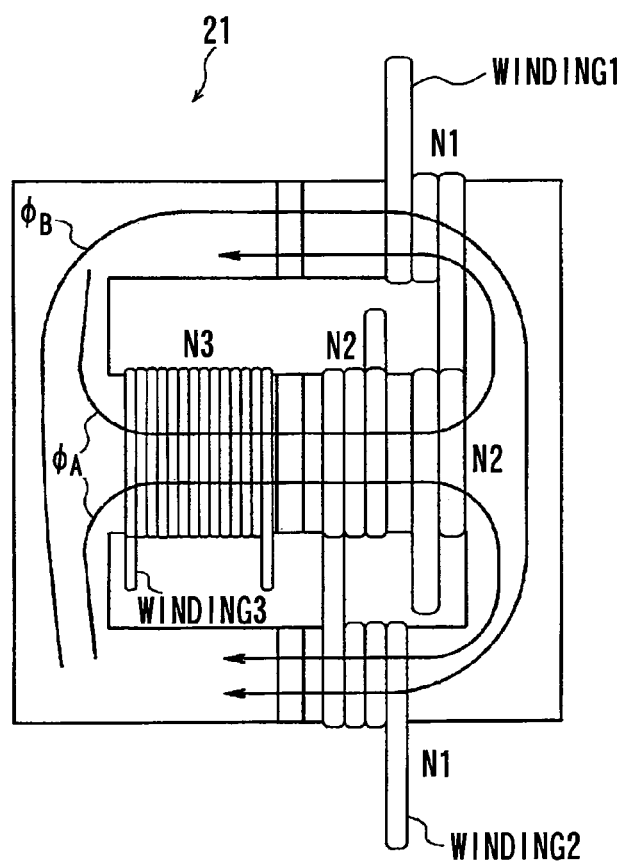
FIG. 19 is a diagram showing a magnetic flux in the magnetic component.

FIG. 18B shows a magnetic path in the magnetic components illustrated in FIG. 17C. As well known, a current flow in a magnetic core induces a magnetic flux. As shown in FIG. 18A, the EE core unit 21 includes three legs, and magnetic fluxes passing through the three legs are expressed as $\phi_1$, $\phi_2$, and $\phi_3$, respectively. Further, as shown in FIG. 19, a magnetic flux passing through a magnetic path along an outer periphery of the EE core unit 21 is expressed as $\phi_B$, and a sum of two magnetic fluxes passing through respective magnetic paths along respective half portions of the EE core unit 21 are expressed as $\phi_A$. Since the magnetic fluxes are able to be stored, the magnetic fluxes satisfy the following equation $\phi$. As shown in FIG. 18B and FIG. 19, the magnetic fluxes $\phi_A$ and $\phi_B$ can be expressed by two equations "$\phi_B = -(\frac{1}{2})\cdot\phi_1 + \phi_3$" and "$\phi_A = \phi_1$". Thus, the magnetic fluxes $\phi_1$, $\phi_2$, and $\phi_3$ satisfy the following equations (2) to (4).

$$\Phi_1 = \Phi_2 + \Phi_3 \tag{1}$$

$$\Phi_1 = \Phi_A \tag{2}$$

$$\Phi_2 = -\left(\Phi_B - \frac{1}{2}\Phi_A\right) \tag{3}$$

$$\Phi_3 = \Phi_B + \frac{1}{2}\Phi_A \tag{4}$$

That is, the magnetic fluxes $\phi_1$, $\phi_2$, and $\phi_3$ of three legs of the EE core unit 21 (magnetic component) can be expressed by addition or subtraction of the two magnetic fluxes $\phi_A$ and $\phi_B$.

As illustrated in FIG. 19, the windings wound around the EE core unit 21 include three winding units 1, 2, and 3, and the number of turns of each winding unit wound around the corresponding leg is expressed as N1, N2, and N3, respectively. Since the magnetic fluxes change while interlinking the turns, an induction voltage is generated under the Faraday's law. Induction voltages $V_A$, $V_B$, and $V_C$ generated by the magnetic flux $\phi_A$ in respective legs are expressed by the following equations (5), (6), and (7), respectively. Therefore, the induction voltages $V_1$, $V_2$, and $V_3$ generated by the magnetic flux $\phi_A$ in respective windings 1, 2, and 3 are expressed by the following equations (8), (9), and (10), respectively.

$$V_A = N_1 \frac{d}{dt}\left(\frac{\Phi_A}{2}\right) \tag{5}$$

$$V_B = N_2 \frac{d}{dt}\Phi_A \tag{6}$$

$$V_C = N_3 \frac{d}{dt}\Phi_A \tag{7}$$

Winding 1:

$$V_1 = V_A + V_B = \left(N_2 + \frac{N_1}{2}\right)\frac{d}{dt}\Phi_A \tag{8}$$

Winding 2:

$$V_2 = V_A + V_B = \left(N_2 + \frac{N_1}{2}\right)\frac{d}{dt}\Phi_A \tag{9}$$

Winding 3:

$$V_3 = V_C = N_3 \frac{d}{dt}\Phi_A \tag{10}$$

Figure 20:
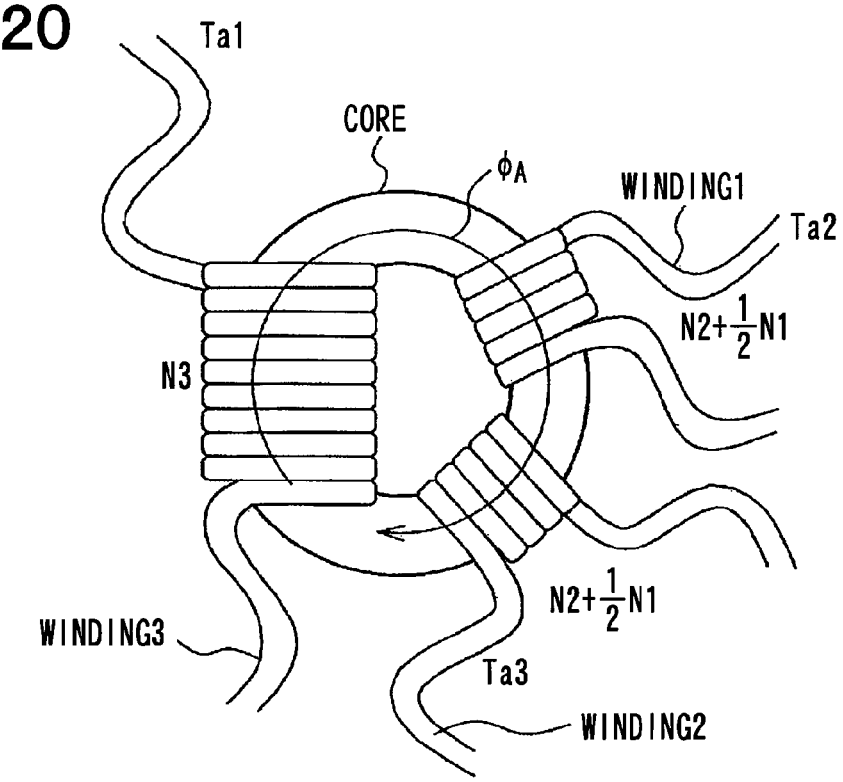
FIG. 20 is a diagram showing a magnetic coupling generated by an inner side magnetic flux of an EE core unit.

It is understood from the equations (8) to (10) that the windings 1 to 3 are magnetically coupled by the magnetic flux $\phi_A$ and a magnetic circuit as illustrated in FIG. 20 is formed. As shown in FIG. 20, the winding 3 having winding number The magnetic flux $\phi_B$ is also studied in a manner similar to the magnetic flux $\phi_A$. Since the magnetic flux $\phi_B$ interlinks the windings 1 and 2 (refer to FIG. 19), induction voltages $V_1'$ and $V_2'$ expressed by the following equations (11) and (12) are generated in the windings 1 and 2 under the Faraday's law, respectively.

Winding 1:

$$V'_1 = N_1 \frac{d}{dt}\Phi_B \tag{11}$$

Winding 2:

$$V'_2 = -N_1 \frac{d}{dt}\Phi_B \tag{12}$$

Figure 21:
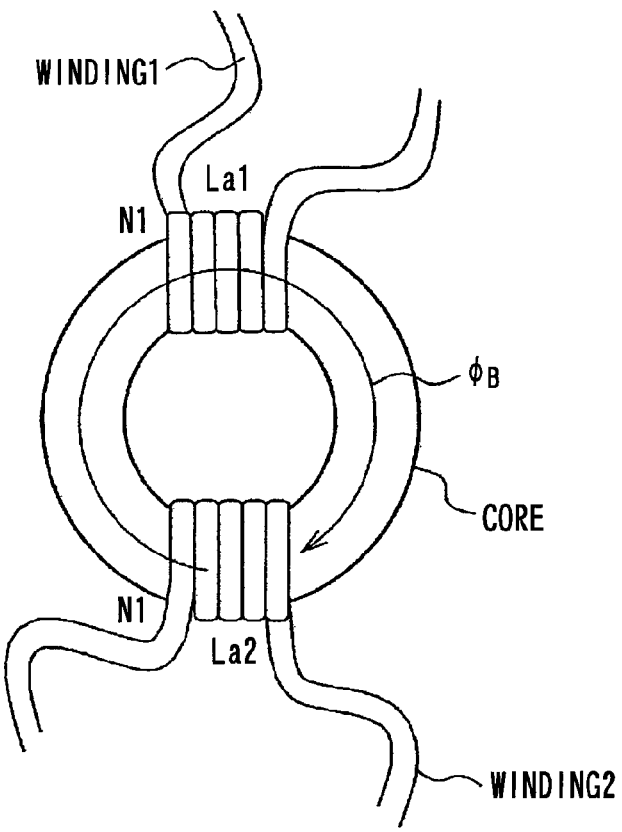
FIG. 21 is a diagram showing a magnetic coupling generated by an outer is side magnetic flux of the EE core unit.

It is understood from the equations (11) and (12) that the windings 1 and 2 are magnetically coupled by the magnetic flux $\phi_B$ and a magnetic circuit as illustrated in FIG. 21 is formed.

Figure 22A:
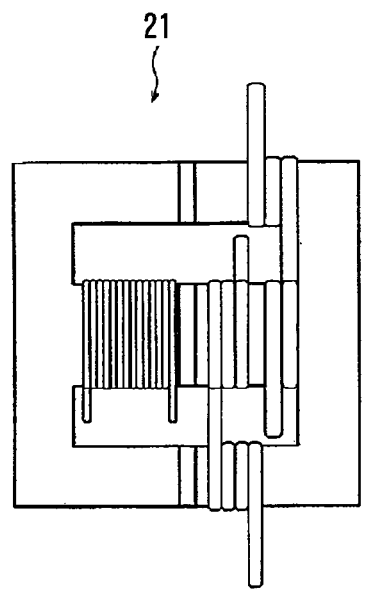
FIG. 22A is a diagram showing a magnetic component having one magnetic core and FIG. 22B is a diagram showing magnetic components having two magnetic cores.
Figure 22B:
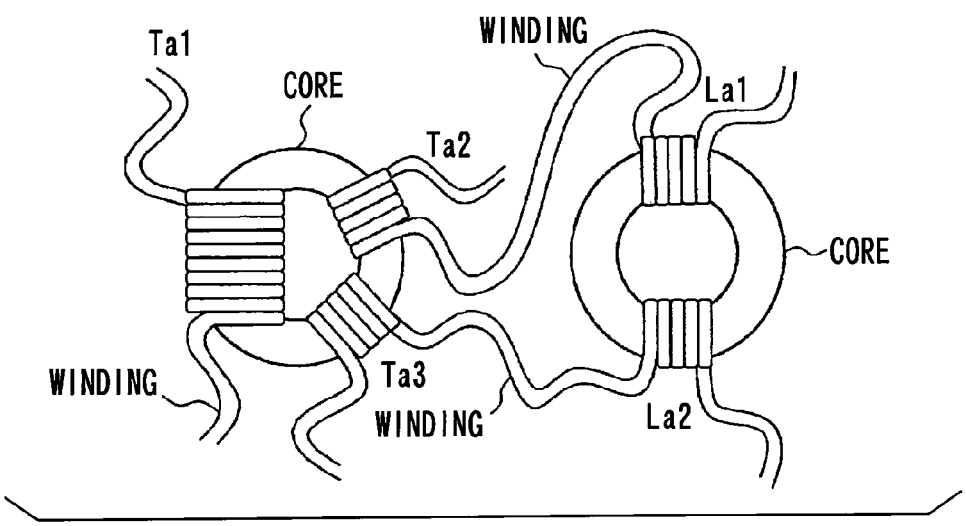
Figure 23A:
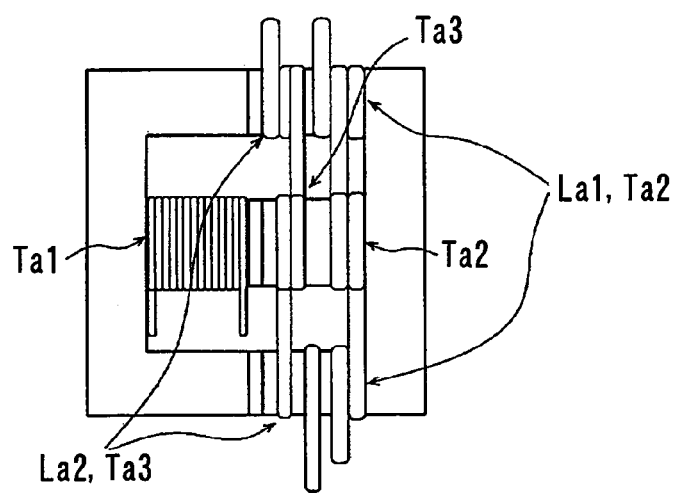
FIG. 23A and FIG. 23B are diagrams showing magnetic components according to a modification of the second embodiment.
Figure 23B:
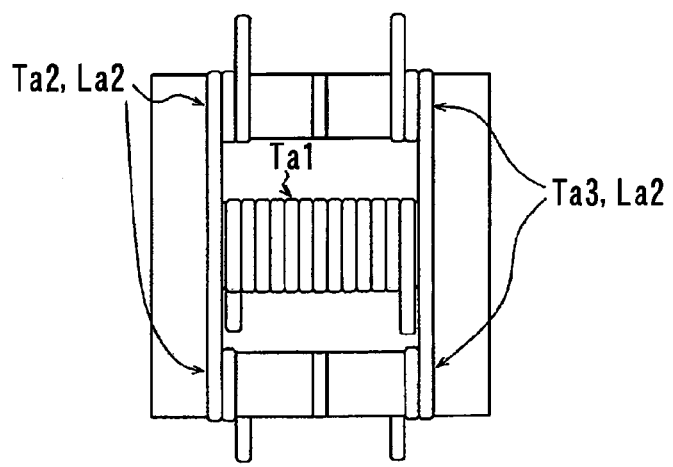

As described above, the magnetic components having the configuration illustrated in FIG. 22A have the same functions as the configuration illustrated in FIG. 22B. The configuration of FIG. 22B corresponds to the configuration according to the first embodiment in which the transformer 10 and the coupled inductor 14 are provided by two separate magnetic cores. Therefore, as illustrated in FIG. 22A, the transformer 10 and the coupled inductor 14 can be realized by one magnetic core, specifically by using the EE core unit 21 shown in FIG. 22A.

A method of configuring the transformer 10 and the coupled inductor 14 using one magnetic core, for example, using one EE core unit 21 is not limited to the above-described configuration. For another example, the transformer 10 and the coupled inductor 14 may have a configuration illustrated in FIG. 23A and FIG. 23B. The configurations shown in FIG. 23A and FIG. 23B have functions similar to the function of the configuration illustrated in FIG. 22A.

When the transformer 10 and the coupled inductor 14 are integrated into one body as described above, the number of magnetic cores in the addition circuit (loss reduction circuit 4) can be reduced and the mounting area necessary for mounting the circuit components can be reduced. Herein, the addition circuit reduces a switching loss during turn-on or turn-off of the switch. Therefore, the switching loss can be reduced while suppressing increase in the constitution of the switching power supply device 1.

Third Embodiment

Figure 24A:
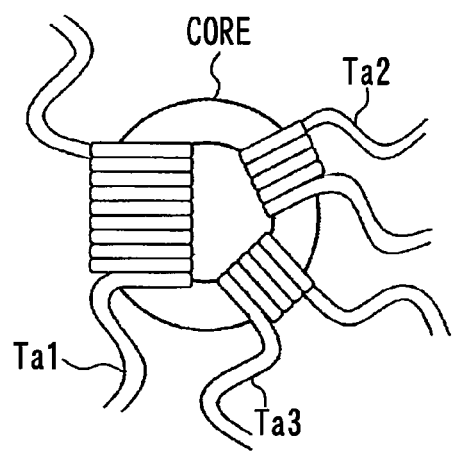
FIG. 24A and FIG. 24B are diagrams showing a magnetic component that realizes a reactor function with a leakage magnetic flux from the secondary windings according to a third embodiment of the present disclosure.
Figure 24B:
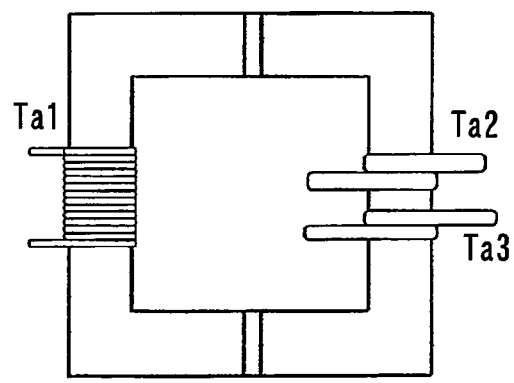

The following will describe a third embodiment with reference to FIG. 24A and FIG. 24B.

The reactors La1 and La2 illustrated in FIG. 1 and the like can also be formed by a leakage magnetic flux from the secondary windings Ta2 and Ta3 of the transformer 10. Specifically, although not illustrated in FIG. 1, inductors generated by leakage magnetic fluxes (corresponding to leakage inductors) are parasitic to the secondary windings Ta2 and Ta3. The leakage inductors operate similar to the is reactors La1 and La2 in the circuit.

In the case of providing the functions of the reactors La1 and La2 with the leakage magnetic fluxes generated by the secondary windings Ta2 and Ta3, magnetic components can be configured as illustrated in FIG. 24A and FIG. 24B. With such a configuration, the amount of windings used for the magnetic components can be reduced without magnetically coupling the reactor La1 with the reactor La2.

Fourth Embodiment

The following will describe a fourth embodiment of the present disclosure reference to FIG. 25A to FIG. 25D. In FIG. 25A to FIG. 25D, switching elements are drawn as normally-used symbols of switches for simplification.

Figure 25A:
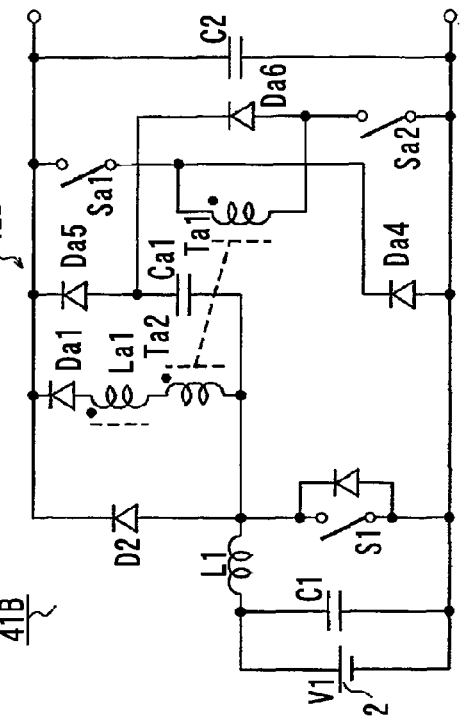
FIG. 25A to FIG. 25D are circuit diagrams showing configurations of switching power supply devices according to a fourth embodiment of the present disclosure.

The loss reduction circuit (the addition circuit for reducing a switching loss) in the first embodiment can be applied also to a switching power supply device having a unidirectional boost chopper. For example, as illustrated in FIG. 25A, the loss reduction circuit 4 illustrated in FIG. 1 can be applied to a switching power supply device 41A including a unidirectional boost chopper. The unidirectional boost chopper is obtained by replacing the switching element S2 included in the bidirectional chopper 3 with a diode D2 (corresponding to a conduction control element).

Figure 25B:
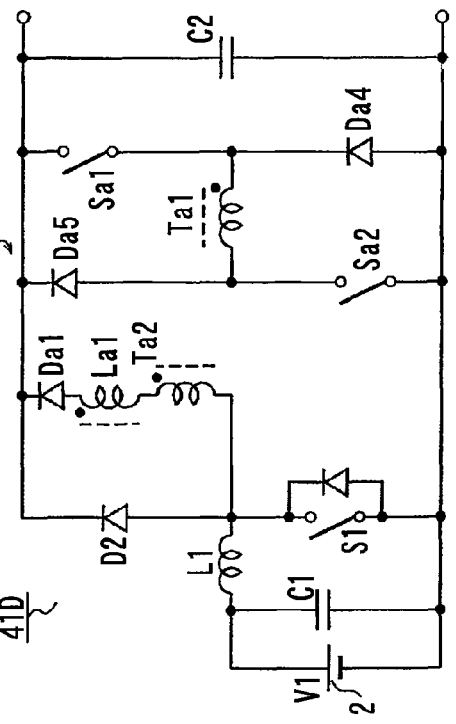

In the switching power supply device 41A to which the loss reduction circuit 4 is applied, the secondary winding Ta3, the reactor La2, the diode Da2, the capacitor Ca2, and the diode Da3 are redundant. FIG. 25B illustrates a configuration of a switching power supply device 41B having a loss reduction circuit 42B obtained by eliminating above-described redundant components. In such a manner, the number of parts and the mounting area for mounting the addition circuit can be reduced. With above-described configuration, the switching power supply devices 41A and 41B reduce the switching loss during the turn-on and turn-off of the switching element S1.

Figure 25C:
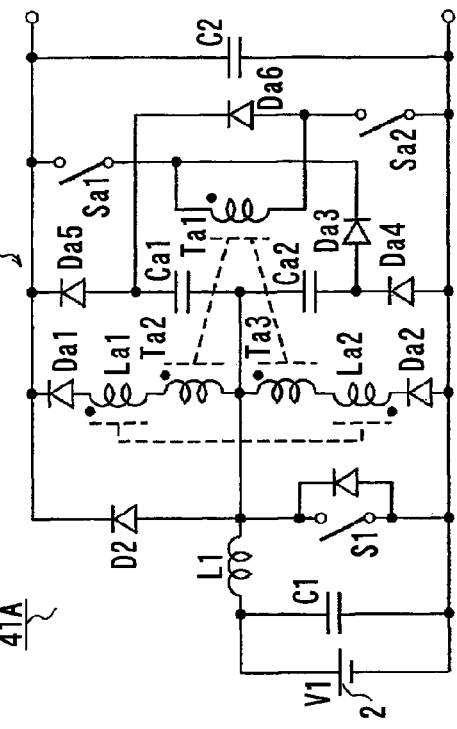

As illustrated in FIG. 25C, the loss reduction circuit 4B illustrated in FIG. 13 can be applied to a switching power supply device 41C including a unidirectional boost chopper.

Figure 25D:
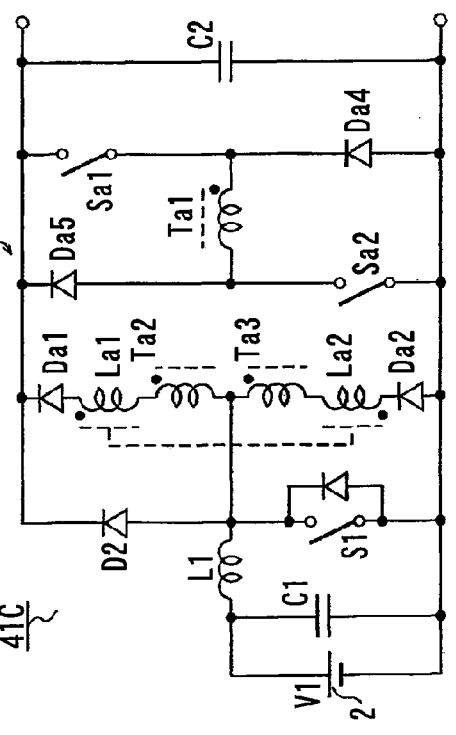

In the switching power supply device 41C to which the loss reduction circuit 4B is applied, the secondary winding Ta3, the reactor La2, and the diode Da2 are redundant. FIG. 25D illustrates a configuration of a power supply device 41D including a loss reduction circuit 42D obtained by eliminating the above-described redundant components. With such a configuration, the number of circuit parts and the mounting area for mounting the addition circuit can be reduced. The switching power supply devices 41C and 41D can reduce a switching loss during the turn-on of the switching element S1.

Fifth Embodiment

The following will describe a fifth embodiment of the present disclosure with reference to FIG. 26A to FIG. 26D. In FIG. 26A to FIG. 26D, switching elements are drawn as normally-used symbols of switches for simplification.

Figure 26A:
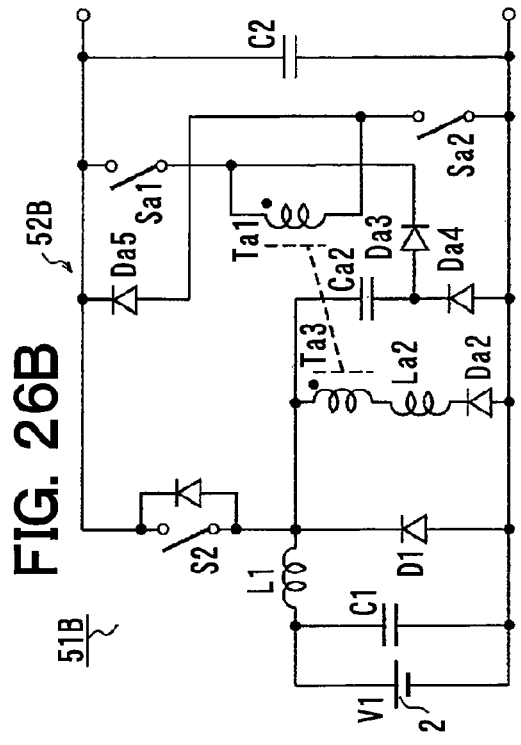
FIG. 26A to FIG. 26D are circuit diagrams showing configurations of switching power supply devices according to a fifth embodiment of the present disclosure.

The loss reduction circuit (the addition circuit for reducing a switching loss) in the first embodiment can also be applied to a switching power supply device including a unidirectional buck chopper. For example, as illustrated in FIG. 26A, the loss reduction circuit 4 illustrated in FIG. 1 can be applied to a switching power supply device 51A including a unidirectional buck chopper. The unidirectional buck chopper is obtained by replacing the switching element S1 included in the bidirectional chopper 3 with a diode D1 (corresponding to a conduction control element).

Figure 26B:
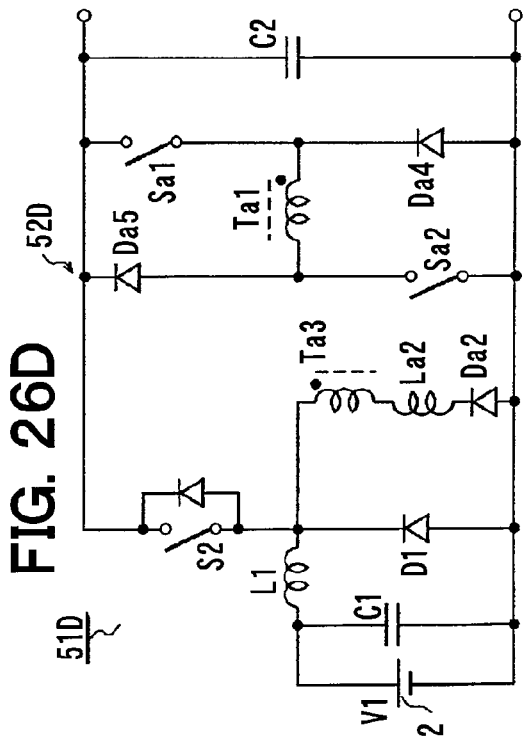

In the switching power supply device 51A to which the loss reduction circuit 4 is applied, the secondary winding Ta2, the reactor La1, the diode Da1, the capacitor Ca1, and the diode Da6 are redundant. FIG. 26B illustrates a configuration of a switching power supply device including a loss reduction circuit 52B obtained by eliminating the above-described redundant components. In such a manner, the number of circuit parts and the mounting area for mounting the addition circuit can be reduced. With the switching power supply devices 51A and 51B, the switching loss during the turn-on and turn-off of the switching element S2 can be reduced.

Figure 26C:
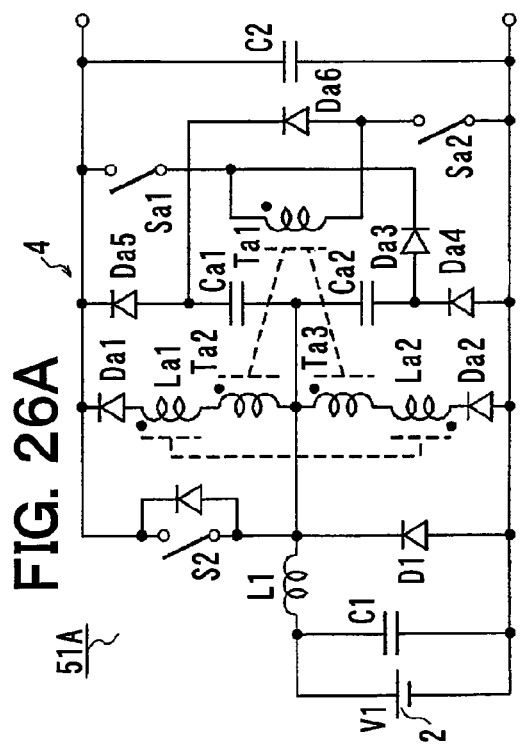

As illustrated in FIG. 26C, the loss reduction circuit 4B illustrated in FIG. 13 can be applied to a switching power supply device 51C including a unidirectional buck chopper.

Figure 26D:
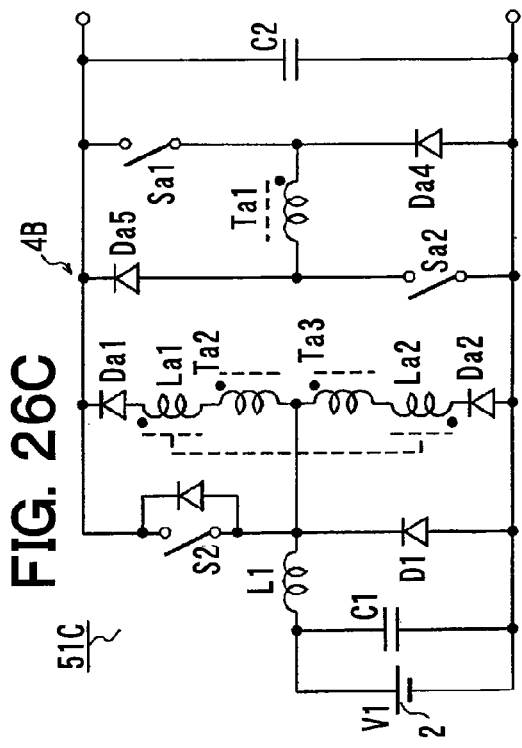

In the switching power supply device 51C to which the loss reduction circuit 4B is applied, the secondary winding Ta2, the reactor La1, and the diode Da1 are redundant. FIG. 26D illustrates a configuration of a switching power supply device 51D including a loss reduction circuit 52D obtained by eliminating the above-described redundant components. With such a configuration, the number of circuit parts and the mounting area for mounting the addition circuit can be reduced. The switching power supply devices shown in 51C and 51D can reduce the switching loss during the turn-on of the switching element S2.

Sixth Embodiment

Figure 27A:
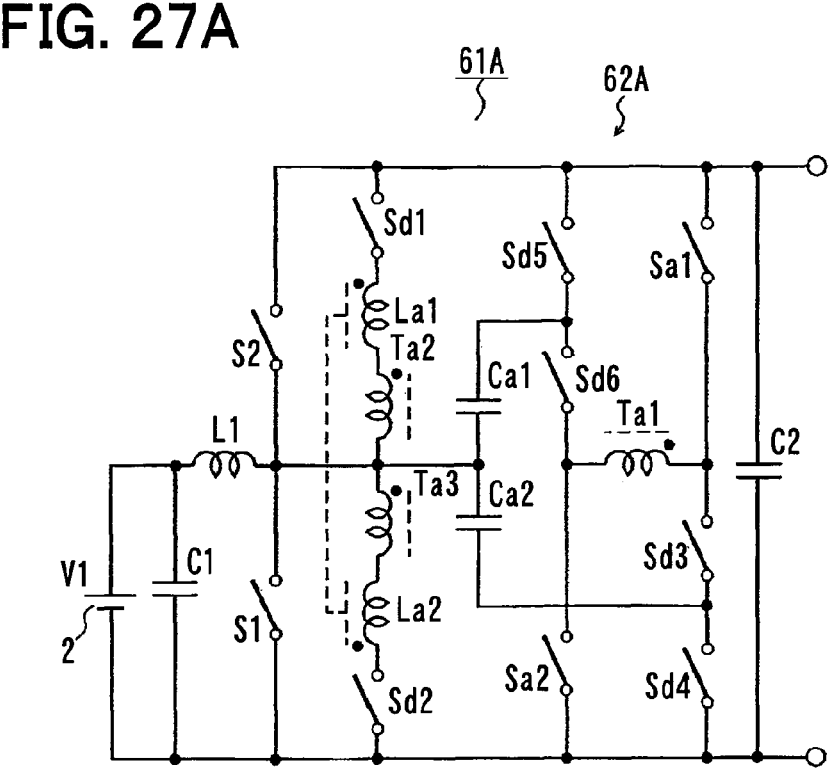
FIG. 27A and FIG. 27B are circuit diagrams showing configurations of switching power supply devices according to a sixth embodiment of the present disclosure.
Figure 27B:
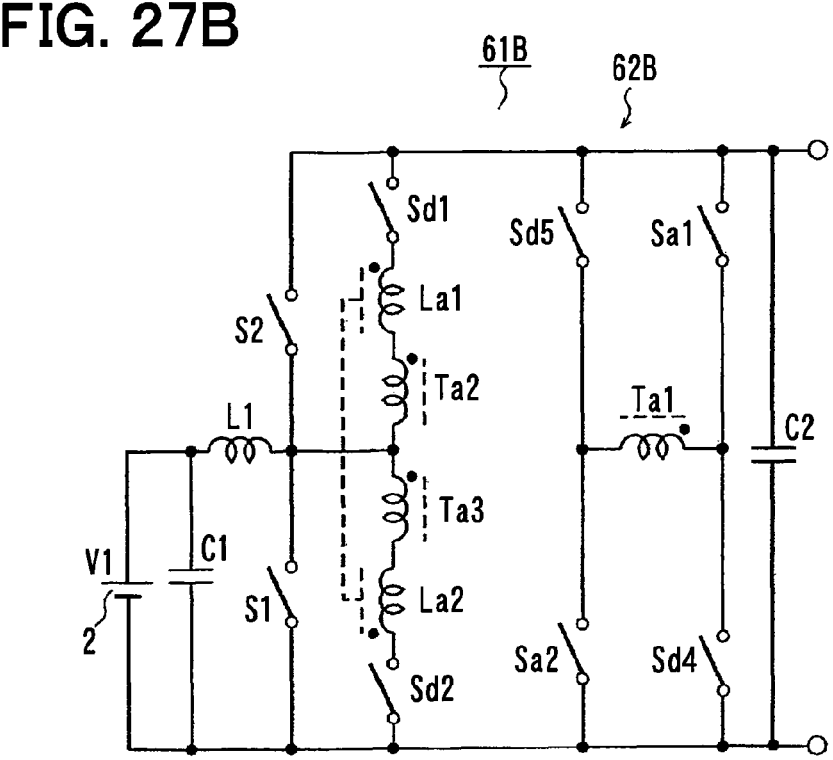

The following will describe a sixth embodiment of the present disclosure with reference to FIG. 27A and FIG. 27B. In FIG. 27A and FIG. 27B, switching elements are drawn as normally-used symbols of switches for simplification.

The diodes Da1 to Da6 in the foregoing embodiments can be replaced with switches, for example, semiconductor switching elements such as MOSFETs. For example, a configuration illustrated in FIG. 27A can be obtained by replacing the diodes Da1 to Da6 of the loss reduction circuit 4 illustrated in FIG. 1 with switches Sd1 to Sd6. For another example, a configuration illustrated in FIG. 27B can be obtained by replacing the diodes Da1, Da2, Da4, and Da5 in the loss reduction circuit 4B illustrated in FIG. 13 with the switches Sd1, Sd2, Sd4, and Sd5.

In switching power supply devices 61A and 61B illustrated in FIG. 27A and FIG. 27B, the switches Sd1 to Sd6 of loss reduction circuits 62A and 62B may be turned on at timings when currents flow through the diodes Da1 to Da6 in the foregoing embodiments (synchronous rectification). With such a configuration, when current flows through the switches, a loss (conduction loss) generated in the diodes Da1 to Da6 due to a forward voltage can be reduced. Therefore, the configuration of the present embodiment is effective to a configuration in which the conduction loss in the diodes Da1 to Da6 is larger than the conduction loss in the switches Sd1 to Sd6.

Seventh Embodiment

Figure 28A:
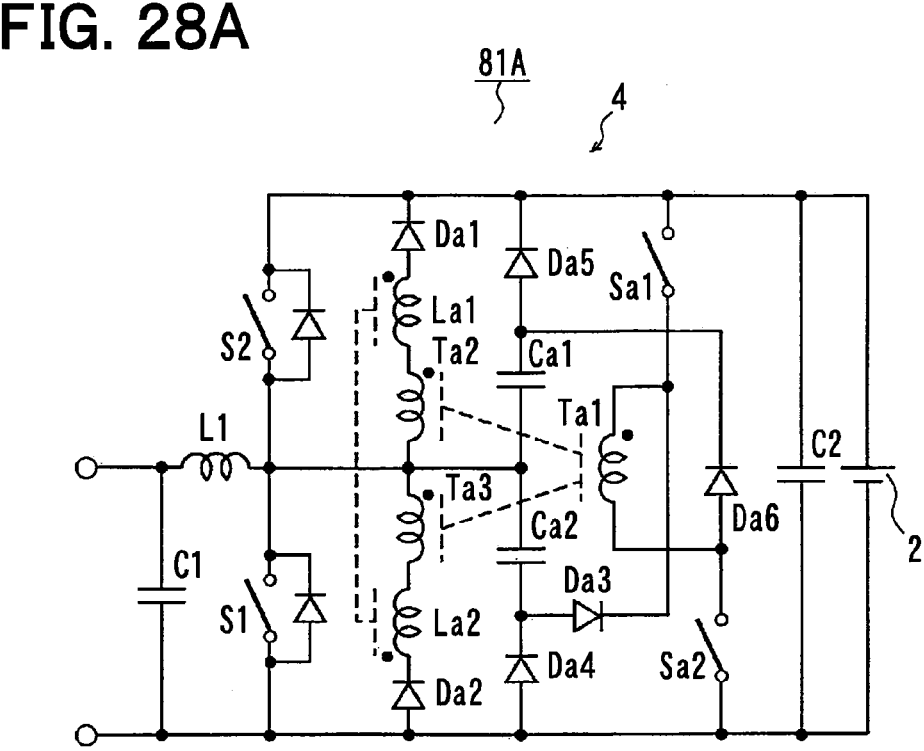
FIG. 28A and FIG. 28B are circuit diagrams showing configurations of switching power supply devices according to a seventh embodiment of the present disclosure.
Figure 28B:
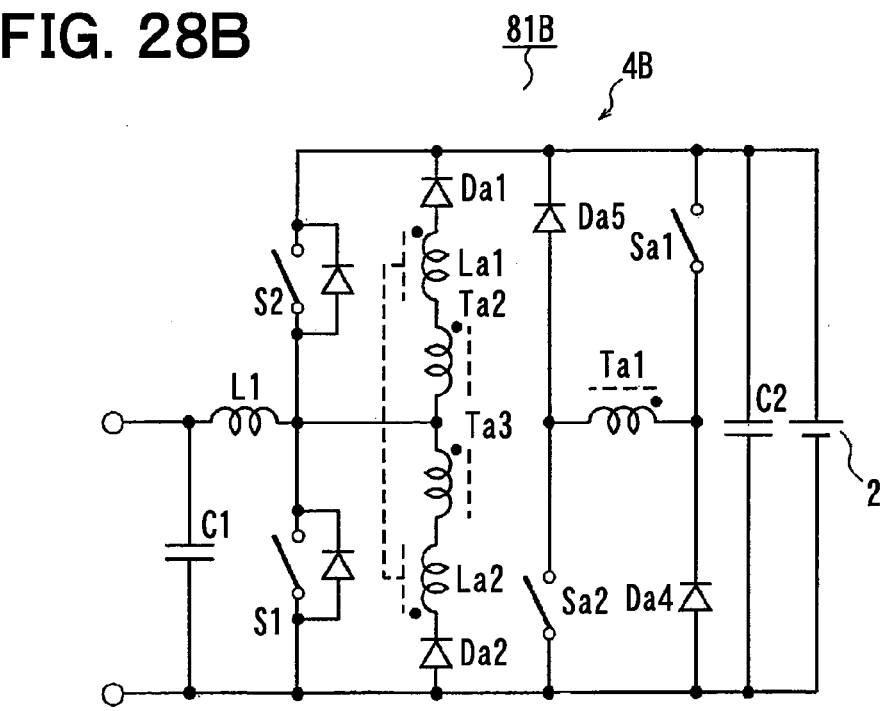

The following will describe a seventh embodiment of the present disclosure with reference to FIG. 28A and FIG. 28B. In FIG. 28A and FIG. 28B, switching to elements are drawn as normally-used symbols of switches for simplification.

The loss reduction circuit in the first embodiment can also be applied to a switching power supply device configured as a bidirectional buck chopper performing a buck operation for decreasing DC voltage supplied from the DC power supply 2 and a boost operation for increasing power regenerated via an output terminal.

For example, a configuration illustrated in FIG. 28A can be obtained by applying the loss reduction circuit 4 illustrated in FIG. 1 to a bidirectional buck chopper. A switching power supply device 81A illustrated in FIG. 28A can reduce a switching loss during the turn-on and turn-off of both of the switching elements S1 and S2. A configuration illustrated in FIG. 28B can be obtained by applying the loss reduction circuit 4B illustrated in FIG. 13 to a bidirectional buck chopper. A switching power supply device 81B illustrated in FIG. 28B can reduce a switching loss during the turn-on of both of the switching elements S1 and S2.

Eighth Embodiment

Figure 29A:
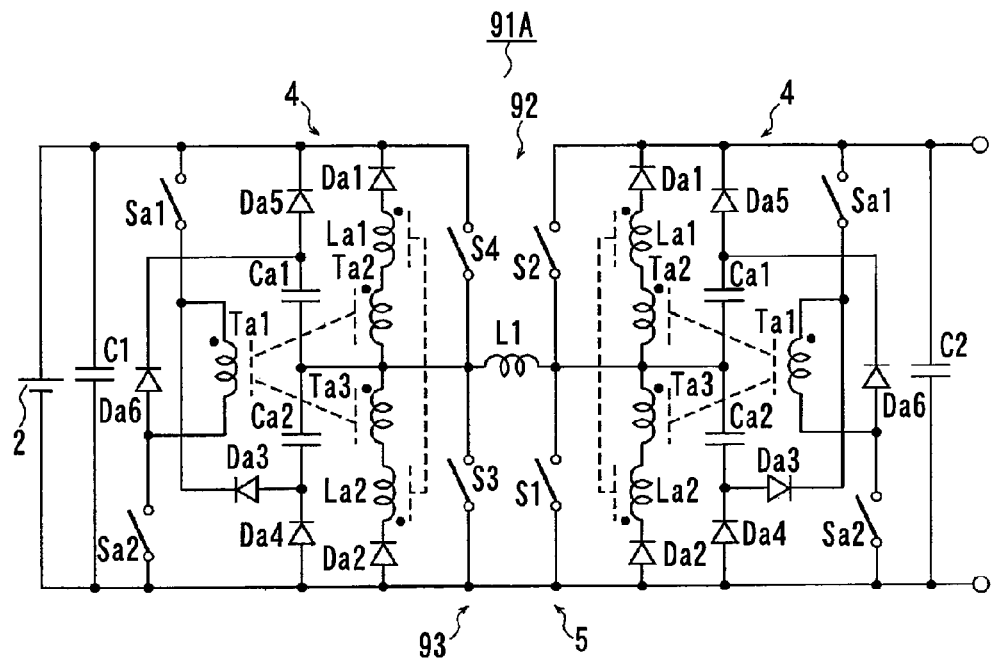
FIG. 29A and FIG. 29B are circuit diagrams showing configurations of switching power supply devices according to an eighth embodiment of the present disclosure.
Figure 29B:
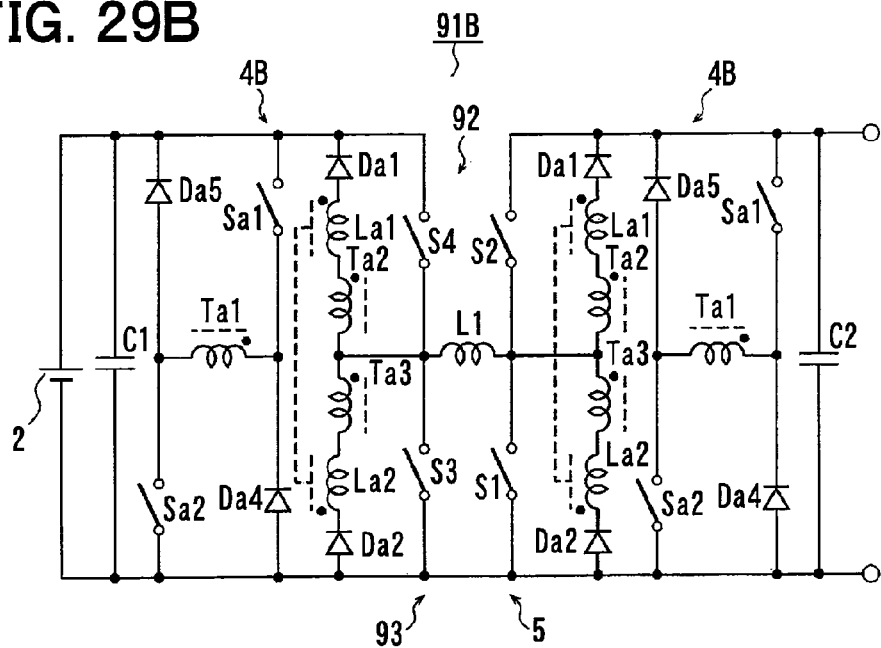

The following will describe an eighth embodiment of the present disclosure with reference to FIG. 29A and FIG. 29B. In FIG. 29A and FIG. 29B, switching elements are drawn as normally-used symbols of switches for simplification.

The loss reduction circuit in the first embodiment can also be applied to a switching power supply device configured as a bidirectional boost/buck chopper performing an operation for increasing or decreasing DC voltage supplied from the DC power supply and an operation for increasing or decreasing power regenerated via an output terminal.

For example, a configuration illustrated in FIG. 29A can be obtained by applying the loss reduction circuit 4 illustrated in FIG. 1 to a bidirectional boost/buck chopper. A switching power supply device 91A illustrated in FIG. 29A includes a bidirectional boost/buck chopper 92, two loss reduction circuits 4, the capacitors C1 and C2, and the like. The bidirectional boost/buck chopper 92 includes the main series circuit 5 in which the switching elements S1 and S2 are connected in series, a main series circuit 93 in which the switching elements S3 and S4 are connected in series, and the reactor L1.

In this case, the reactor L1 is connected between two common connection points of respective two main series circuits 5 and 93. The main series circuit 93 is connected between the terminals of the DC power supply 2. One of the two loss reduction circuits 4 is connected in parallel to the capacitor C1, and the other is connected in parallel to the capacitor C2. The switching power supply device 91A having such a configuration can reduce a switching loss during the turn-on and turn-off of the switching elements S1 to S4.

A configuration illustrated in FIG. 29B can be obtained by applying the loss reduction circuit 4B illustrated in FIG. 13 to a bidirectional boost/buck chopper. A switching power supply device 91B illustrated in FIG. 29B includes the bidirectional boost/buck chopper 92, two loss reduction circuits 4B, capacitors C1 and C2, and the like. One of the two loss reduction circuits 4B is connected in parallel to the capacitor C1, and the other is connected in parallel to the capacitor C2. The switching power supply device 91B having such a configuration can reduce a switching loss during the turn-on of the switching elements S1 to S4.

Ninth Embodiment

Figure 30A:
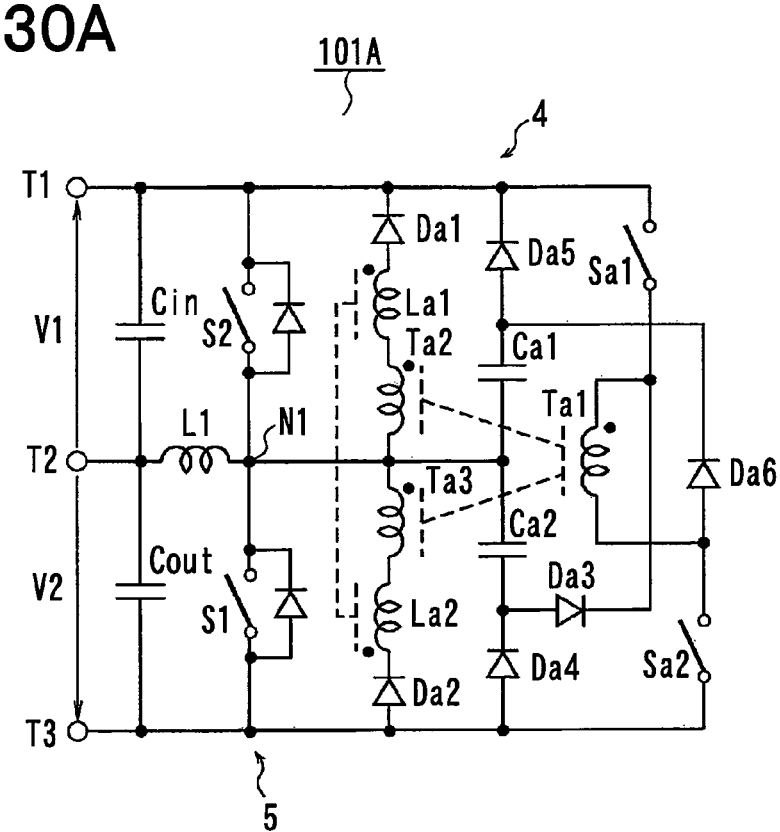
FIG. 30A and FIG. 30B are circuit diagrams showing configurations of switching power supply devices according to a ninth embodiment of the present disclosure.
Figure 30B:
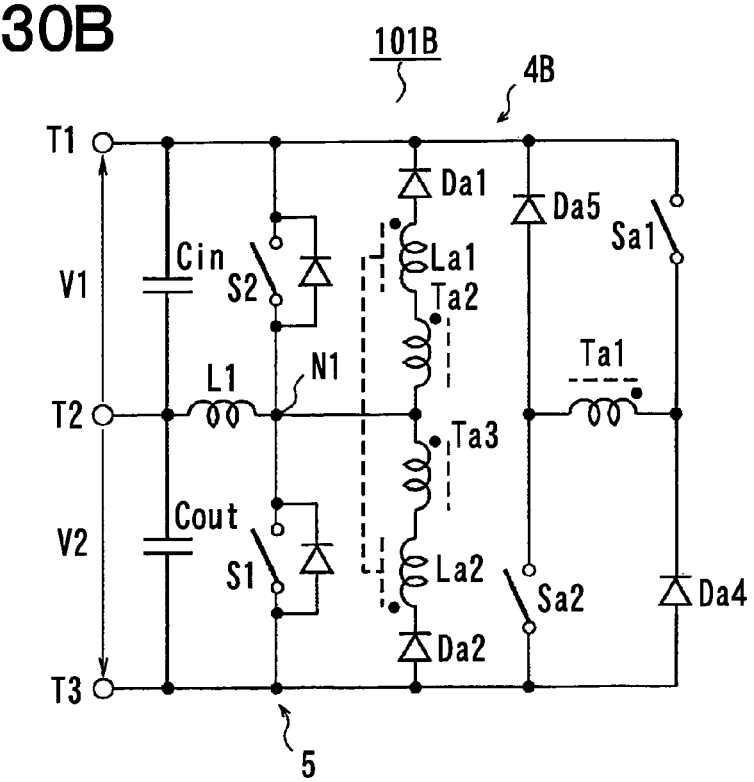

The following will describe a ninth embodiment of the present disclosure with reference to FIG. 30A and FIG. 30B. In FIG. 30A and FIG. 30B, switching elements are drawn as normally-used symbols of switches for simplification.

The loss reduction circuit in the first embodiment can also be applied to a switching power supply device configured as a bidirectional inversion boost/buck chopper. For example, a configuration illustrated in FIG. 30A can be obtained by applying the loss reduction circuit 4 illustrated in FIG. 1 to a bidirectional inversion boost/buck chopper.

In a switching power supply device 101A illustrated in FIG. 30A, suppose that a signal is input between the terminals T1 and T2, and a signal is output between the terminals T2 and T3. In this case, a capacitor Cin is connected between the terminals T1 and T2, and a capacitor Cout is connected between the terminals T2 and T3. Between the terminals T1 and T3, the main series circuit 5 and the loss reduction circuit 4 are connected. In this case, the reactor L1 is connected between the terminal T2 and the common connection point (node N1) of the main series circuit 5.

In the above configuration, when the switching element S2 is turned on, the current flows to the reactor L1. After that, when the switching element S2 is turned off, current for charging the capacitor Cout flows through a freewheel diode of the switching element S1 and a potential at the terminal T2 becomes a reference potential. At this time, a polarity of the output voltage V2 becomes inversed with a polarity of the input voltage V1.

On the other hand, when the switching element S1 is turned on, the current flows to the reactor L1. After that, when the switching element S1 is turned off, current for charging the capacitor Cin flows through a freewheel diode of the switching element S2 and a potential at the terminal T2 becomes a reference potential. At this time, a polarity of the output voltage V1 becomes to inversed with a polarity of the input voltage V2. The switching power supply device 101A having above-described configuration can reduce a switching loss during the turn-on and turn-off of both of the switching elements S1 and S2.

A configuration illustrated in FIG. 30B can be obtained by applying the loss reduction circuit 4B illustrated in FIG. 13 to a bidirectional inversion boost/buck chopper. The switching power supply device 101B illustrated in FIG. 30B can reduce a switching loss during the turn-on of both of the switching elements S1 and S2. The terminals T2 and T3 may be used for as input terminals for inputting signals, and the terminals T1 and T2 may be used as output terminals for outputting signals.

Tenth Embodiment

Figure 31A:
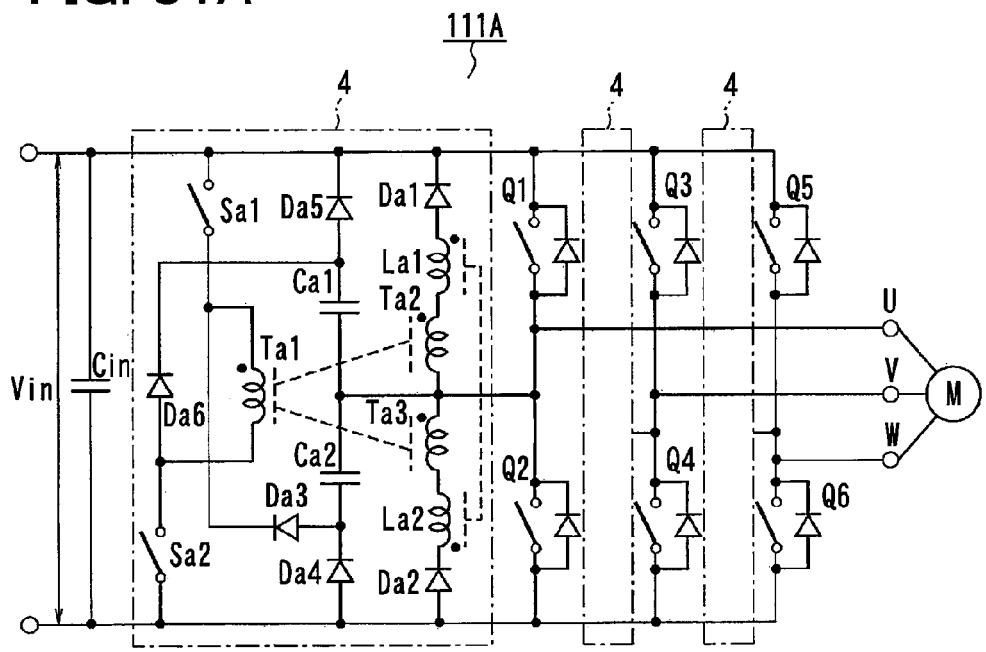
FIG. 31A and FIG. 31B are circuit diagrams showing inverter circuit configurations including respective loss reduction circuits according to a tenth embodiment of the present disclosure.
Figure 31B:
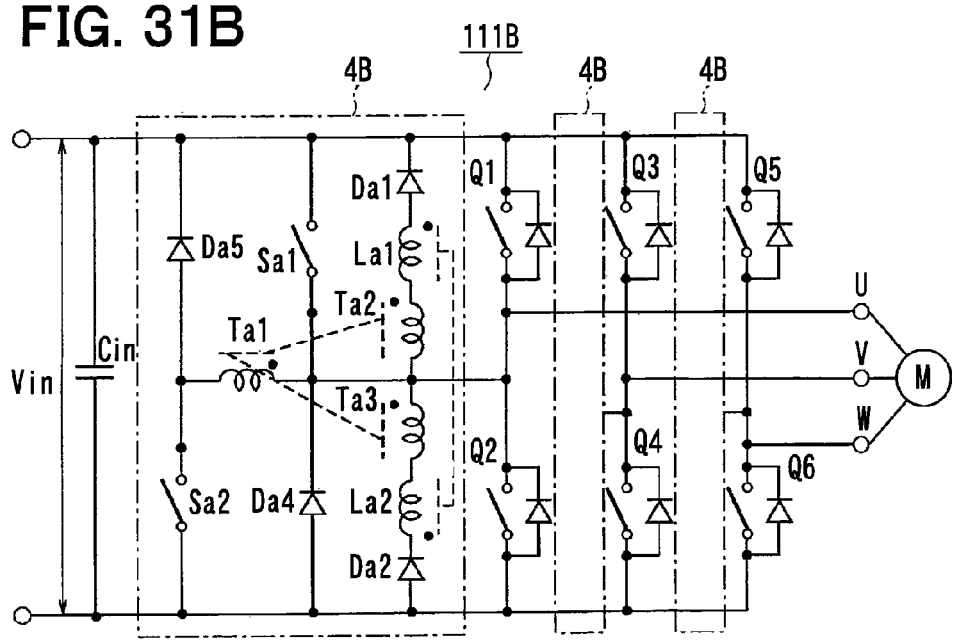

The following will describe a tenth embodiment of the present disclosure with reference to FIG. 31A and FIG. 31B. In FIG. 31A and FIG. 31B, switching elements are drawn as normally-used symbols of switches for simplification.

The loss reduction circuit in the first embodiment can also be applied to an inverter circuit. For example, a configuration illustrated in FIG. 31A can be obtained by applying the loss reduction circuit 4 illustrated in FIG. 1 to an inverter circuit 111A (corresponding to a power conversion device) that drives a motor M.

In this case, switching elements Q1 and Q2 are connected in series as a main series circuit and function as an arm of U phase, switching elements Q3 and Q4 are connected in series as a main series circuit and functions as an arm of V phase, and switching elements Q5 and Q6 are connected in series as a main series circuit and functions as an arm of W phase. The common connection points of respective series circuits are also referred to as phase output terminals, and are connected to respective windings (not illustrated) that provide U phase, V phase, and W phase of the motor M. The loss reduction circuits 4 corresponding to the phases are connected between DC buses of the inverter circuit 111A, and the common connection points of the capacitors Ca1 and Ca2 are connected to the output terminals of the respective phases of the inverter circuit 111A. In FIG. 31A, only the loss reduction circuit 4 for the U phase is illustrated in detail, and the loss reduction circuits 4 for V phase and W phase are simplified.

In this case, the loss reduction circuit 4, the configurations of the main series circuits configuring the arms of the respective phases, and the windings (not illustrated) of the motor M connected to the common connection points are equivalent to the switching power supply device 81A illustrated in FIG. 28A. Therefore, by operating the loss reduction circuit 4 in an interlocking manner when the arms of the respective phases of an inverter circuit 111A perform a switching operation, a switching loss during the turn-on and turn-off of the switching elements Q1 to Q6 can be reduced.

When the loss reduction circuit 4B illustrated in FIG. 13 is applied to an inverter circuit 111B (corresponding to a power conversion device) driving the motor M, a configuration illustrated in FIG. 31B is obtained. Also by such a configuration, by operating the loss reduction circuit 4B in an interlocking manner when the arms of the respective phases of the inverter circuit 111B perform a switching operation, a switching loss during the turn-on of the switching elements Q1 to Q6 can be reduced. In FIG. 31B, only the loss reduction circuit 4B for the U phase is illustrated in detail, and the loss reduction circuits 4B for V phase and W phase are simplified.

Eleventh Embodiment

Figure 32:
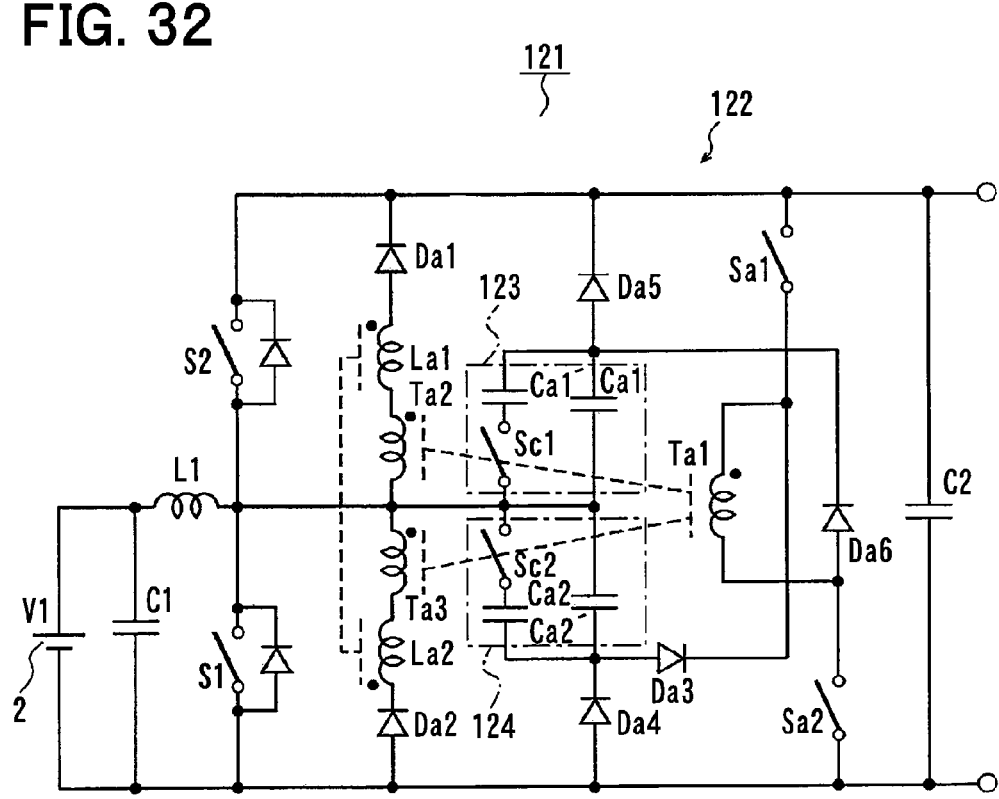
FIG. 32 is a circuit diagram showing a configuration of a switching power supply device according to an eleventh embodiment of the present disclosure.

The following will describe an eleventh embodiment of the present disclosure with reference to FIG. 32. In FIG. 32, switching elements are drawn as normally-used symbols of switches for simplification.

A loss reduction circuit 122 of a switching power supply device 121 of the present embodiment illustrated in FIG. 32 is obtained by adding capacitors Ca1' and Ca2' and switching elements Sc1 and Sc2 to the loss reduction circuit 4 illustrated in FIG. 1. In this case, a series circuit including the capacitor Ca1, the switching elements Sc1 and Sc2, and the capacitor Ca2' is connected in parallel to a series circuit including the capacitors Ca1 and Ca2. A common connection point of the switching elements Sc1 and Sc2 is connected to the node N1.

In the switching power supply device 121 having above-described configuration, turning on or turning off operation of the switching elements Sc1 and Sc2 can change the capacitance of a capacitor (Hereinafter, referred to as a snubber capacitor) which is charged during the period M6, M12. In the present embodiment, the capacitors Ca1 and Ca1' and the switching element Sc1 configure an electricity storage element 123 whose capacitance can be changed, and the capacitors Ca2 and Ca2' and the switching element Sc2 form an electricity storage element 124 whose capacitance can be changed.

When relatively low current flows through the reactor L1 (reactor current) and the capacitance of the snubber capacitor is substantially large, the snubber capacitor may be not charged during turn-off of the switching element S1 or S2. As a result, a turn-off loss cannot be effectively reduced, and the power conversion efficiency may be degraded. Consequently, when the current flowing through the reactor is relatively low, the switching elements Sc1 and Sc2 can be turned off for forming a snubber capacitor by the capacitances of the capacitors Ca1 and Ca2. On the other hand, when the reactor current is relatively high, the switching elements Sc1 and Sc2 can be turned on to connect the capacitor Ca1' in parallel to the capacitor Ca1 and connect the capacitor Ca2' in parallel to the capacitor Ca2. With this configuration, the capacitance of the snubber capacitor can be increased.

By controlling the switching elements, even in the case where the magnitude of reactor current changes in a wide range, a switching loss during the turn-off of both of the switching elements S1 and S2 can be effectively reduced without decreasing the power conversion efficiency. The capacitance of the electricity storage element can be changed by connecting three or more series circuits each including a switching element and a capacitor connected in parallel.

Twelfth Embodiment

Figure 33:
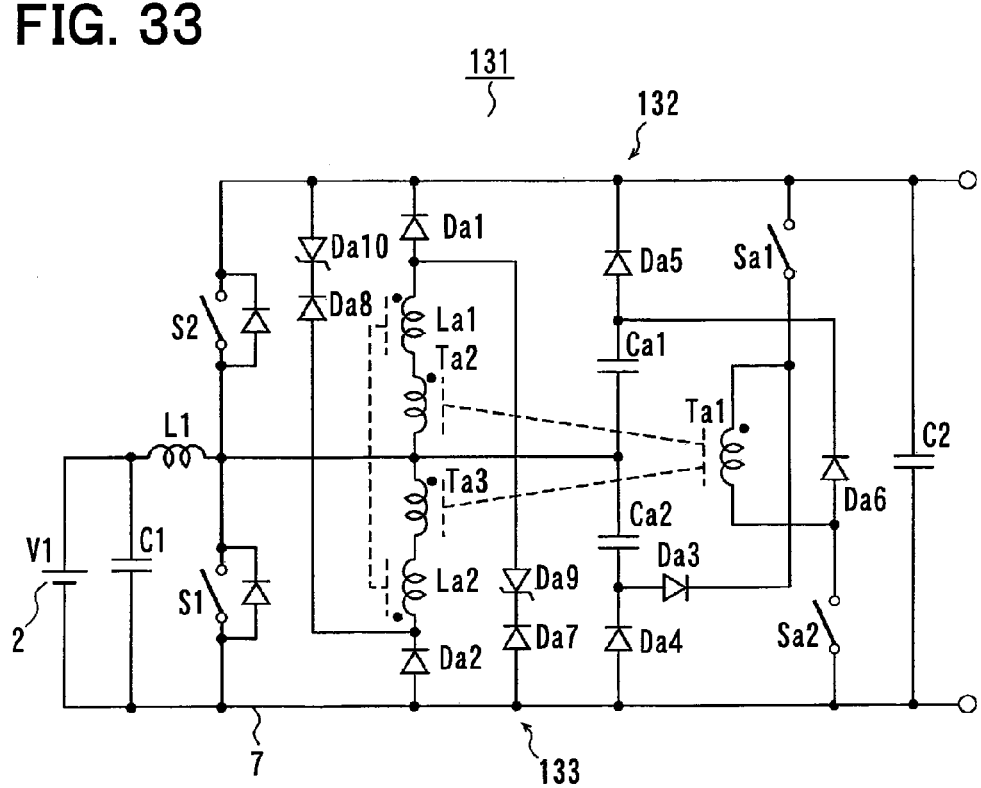
FIG. 33 is a circuit diagram showing a configuration of a switching power supply device according to a twelfth embodiment of the present disclosure.

The following will describe a twelfth embodiment of the present disclosure with reference to FIG. 33. In FIG. 33, switching elements are drawn as normally-used symbols of switches for simplification.

A loss reduction circuit 132 of a switching power supply device 131 of the present embodiment illustrated in FIG. 33 is obtained by adding a protection circuit 133 to the loss reduction circuit 4 illustrated in FIG. 1. The protection circuit 133 includes diodes Da7 and Da8 and Zener diodes Da9 and Da10. The anode of the diode Da7 is connected to the power supply line 7 and the cathode of the diode Da7 is connected to the cathode of the Zener diode Da9. The anode of the Zener diode Da9 is connected to the anode of the diode Da1. The anode of the diode Da8 is connected to the cathode of the diode Da2 and the cathode of the diode Da8 is connected to the cathode of the Zener diode Da10. The anode of the Zener diode Da10 is connected to the power supply line 6.

Above-described configuration can suppress excessively high reverse voltage generated in the diodes Da1 and Da2. The excessively high reverse voltage generated in the diodes Da1 and Da2 are caused by recovery currents generate in the diodes Da1 and Da2 during the period M6, M12. Even when the Zener diodes Da9 and Da10 are eliminated from the configuration of FIG. 33, the adverse effect caused by the recovery current can be solved. However, in this configuration, during the period M6, M12, unnecessary current that does not contribute to the circuit operation flows in a path including the diode Da7, the secondary winding Ta2, the switching element S1 in described order, or flows in a path including the secondary winding Ta3, the diode Da8, the switching element S2 in described order, and accordingly a switching loss is increased.

The Zener diodes Da9 and Da10 are provided to suppress the unnecessary current that contributes nothing to the circuit operation. Therefore, as the Zener diodes Da9 and Da10, a Zener diode whose specification satisfies the following equation (13) is used. The Zener voltage of the Zener diodes Da9 and Da10 is expressed as Vz, and the turn ratio of the transformer 10 is expressed as n.

$$Vz > V2/n \qquad (13)$$

Thirteenth Embodiment

Figure 34:
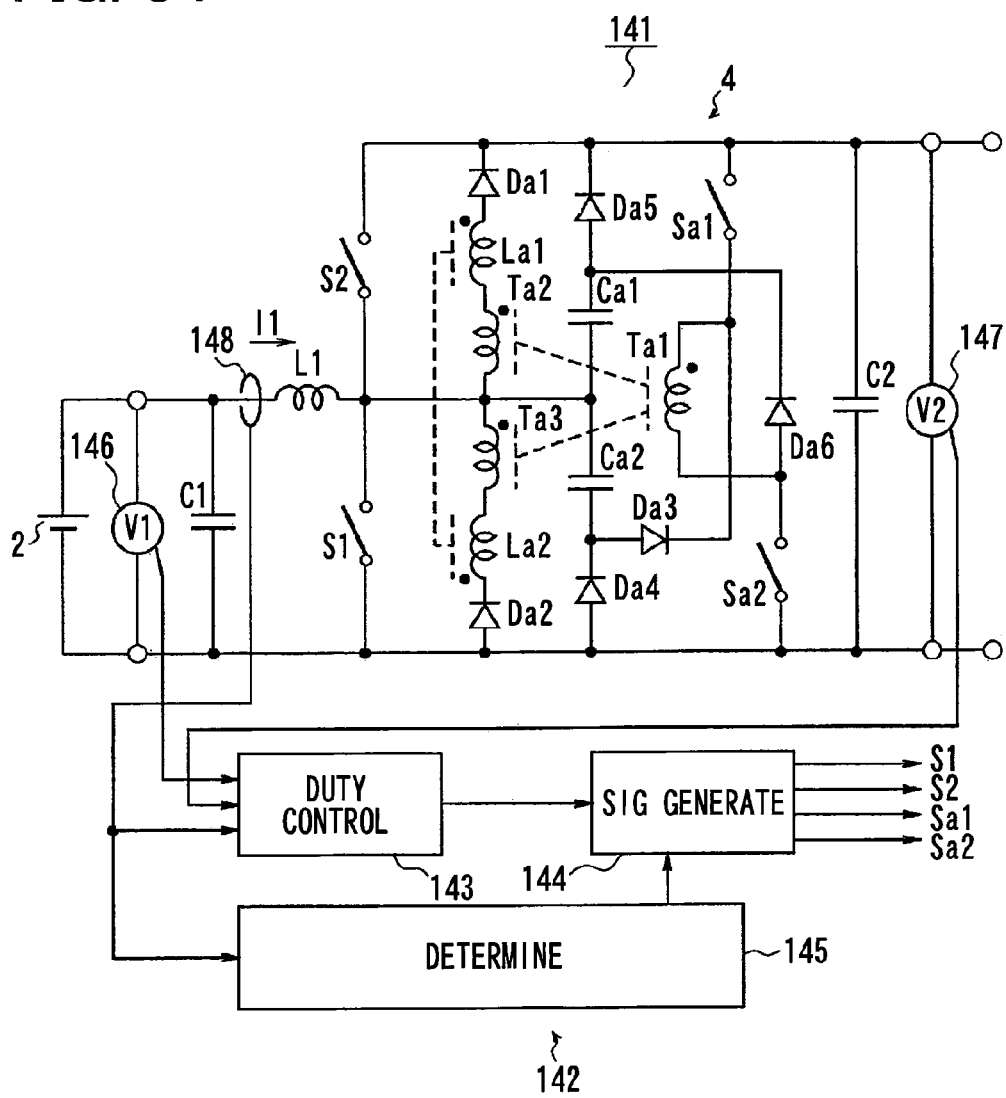
FIG. 34 is a circuit diagram showing a configuration of a switching power supply device according to a thirteenth embodiment of the present disclosure.
Figure 35:
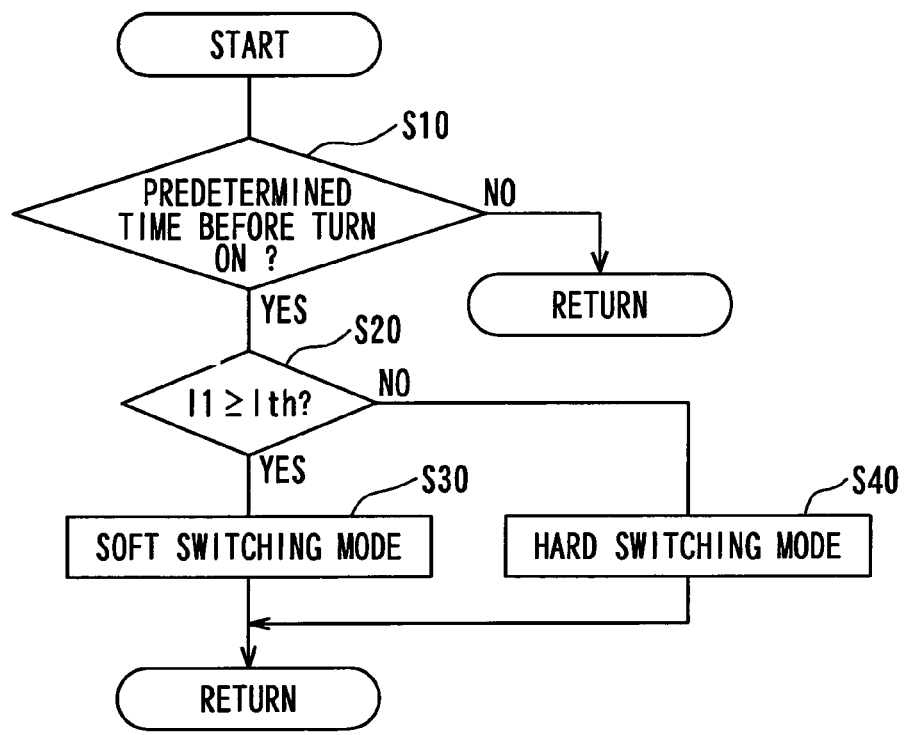
FIG. 35 is a flowchart showing a control process executed for switching a switching mode.

The following will describe a thirteenth embodiment of the present disclosure with reference to FIG. 34 and FIG. 35. In FIG. 34, switching elements are drawn as normally-used symbols of switches for simplification.

A switching power supply device 141 of the present embodiment illustrated in FIG. 34 is obtained by adding a control circuit unit 142 and the like to the switching power supply device 1 shown in FIG. 1. The control circuit unit 142 includes a duty control unit (DUTY CONTROL) 143, a signal generation unit (SIG GENERATE) 144, and a determination unit (DETERMINE) 145.

A voltage sensor 146 is connected to two ends of the capacitor C1, that is, the DC power supply 2 on the input side, and a voltage sensor 147 is connected to two ends of the capacitor C2 on the output side. A current sensor 148 (corresponding to a current detection unit) is disposed at a terminal of the reactor L1 adjacent to the capacitor C1. Detection signals of the sensors 146 to 148 are is supplied to the duty control unit 143. A detection signal of the current sensor 148 is supplied to the determination unit 145.

The duty control unit 143 generates a duty instruction for pulse width modulation (PWM) control based on the input voltage V1 and the output voltage V2 detected by the voltage sensors 146 and 147 and an absolute value I1 of the reactor current detected by the current sensor 148. Then, the duty control unit 143 outputs the duty instruction to the signal generation unit 144. The signal generation unit 144 generates a PWM signal based on the inputted duty instruction and outputs the PWM signal to the switching elements S1 and S2 to control the on state or off state of the switching elements S1 and S2. The signal generation unit 144 outputs a control signal to turn on or turn off the switching elements Sa1 and Sa2 in accordance with the PWM signal output to the switching elements S1 and S2.

The determination unit 145 determines a mode to be selected between a hard switching mode and soft switching mode based on based on the absolute value I1 of the reactor current flowing through the reactor L1. During the hard switching mode, switching operation of the switching elements S1 and S2 are controlled. During the soft switching mode, in addition to the switching operation of the switching elements S1 and S2, turning on and turning off of the switching elements Sa1 and Sa2 are controlled associated with the switching operation of the switching elements S1 and S2. Then, the determination unit 145 outputs a mode switch signal to the signal generation unit 144. According to the mode expressed by the mode switch signal, the signal generation unit 144 determines whether to turn on or turn off the switching elements Sa1 and Sa2.

The mode switch determination carried out by the determination unit 145 is illustrated in a flowchart of FIG. 35 in detail. When the absolute value I1 of the reactor current becomes a peak at which the increasing value changes to decrease, the determination unit 145 determines whether the present time becomes a predetermined period before the turning on of the switching element S1 or S2 (S10). When the determination unit 145 determines that the present time is prior to the turning on of the switching element by the predetermined period (S10: YES), the determination unit 145 determines whether the absolute value I1 of the reactor current at that time point is equal to or larger than a threshold value Ith (S20).

When the determination unit 145 determines that the absolute value I1 of the reactor current is equal to or larger than the threshold value Ith (S20: YES), the determination unit 145 selects the soft switching mode (S30). In the case where the determination unit 145 determines that the absolute value I1 of the reactor current is less than the threshold value Ith (S20: NO), the determination unit 145 selects the hard switching mode (S40).

When the switching elements Sa1 and Sa2 are turned on or turned off under relatively low absolute value I1 of the reactor current, a loss occurring in the loss reduction circuit 4 becomes larger than the loss reduced by the loss reduction circuit 4 and the power conversion efficiency may be deteriorated as a result. In the present embodiment, as described above, when the absolute value I1 of the reactor current is lower than the threshold value Ith, deterioration of the power conversion efficiency can be suppressed by switching only the switching elements S1 and S2 under a condition that the switching elements Sa1 and Sa2 are maintained in off state.

As another example, the current sensor 148 may detect an input current in the positive-side terminal of the DC power supply 2, an output current of the switching power supply device 141, currents (collector current and emitter current) flowing in the main terminals of the switching elements S1 and S2 and the like, and the absolute value I1 of the reactor current may be estimated based on the current signals detected by the current sensor 148.

In the present embodiment, the absolute value I1 of the reactor current flowing through the reactor L1 is detected by the current sensor 148. When the detection value of the absolute value I1 of the reactor current is less than the threshold value Ith, the switching elements Sa1 and Sa2 are maintained in the off state. Thus, when a reduction of a switching loss is unnecessary, such as a when input power to the device is small, a loss generated in the loss reduction circuit 4 can be suppressed.

Other Embodiments

The present disclosure is not limited to the foregoing embodiments which are illustrated in the drawings and can be modified or expanded as follows.

The order of connecting the diode Da1, the reactor La1, and the secondary winding Ta2 in series and the order of connecting the secondary winding Ta3, the reactor La2, and the diode Da2 in series are not limited to the described order in the foregoing embodiments. As another example, the components may be connected in series in a different order. Even when the components are connected in series in different order, operations and effects similar to above-described operations and effects in the foregoing embodiments can be obtained.

As another example, in the transformer 10, the number of turns of the primary winding Ta1 may be almost equal to or less than the total number of turns of the secondary winding Ta2 and the turns of the secondary winding Ta3.

As another example, the transformer 10 may have three or more secondary windings. In this case, additional secondary winding can be connected with the secondary windings Ta2 and Ta3 in series.

The switching element is not limited to IGBT or MOSFET. As another example, the switching element may be provided by a bipolar transistor.

The operation of turning off the switching elements Sa1 and Sa2 is not limited after the turn-on of the switching elements S1 and S2. As another example, the operation of turning off the switching elements Sa1 and Sa2 may be carried out at the same time with the turn-on of the switching elements S1 and S2, or before the turn-on of the switching elements S1 and S2. In this case as well, a current flow changed to the secondary winding of the transformer 10 during the period M4, M10 maintains a communicated state for a while, so that an effect similar to that of the case where the switching elements S1 and S2 are turned on and then turned off can be obtained.

The operation of turning on the switching elements Sa1 and Sa2 may be performed at the same time with the operation of turning on one of the switching elements S1 and S2, or after the operation of turning on one of the switching elements S1 and S2. In such a case as well, the capacitors Ca1 and Ca2 are charged after the switching elements Sa1 and Sa2 are turned off. Therefore, also in this case, a turn-off loss is reduced certainly and, as a result, a switching loss can be reduced.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A power conversion device comprising:
   a main series circuit including two circuit elements connected in series at a common connection point;
   a main inductance element connected with the common connection point of the main series circuit;
   a transformer having a primary winding and a secondary winding;
   an auxiliary switching unit switching an operation state of the primary winding between a conduction state and a non-conduction state; and
   a rectifying unit allowing an electric current to flow in one direction and blocking an electric current in an opposite direction, wherein
   the primary winding is connected with the main series circuit in parallel via the auxiliary switching unit,
   the secondary winding is connected between main terminals of one of the two circuit elements included in the main series circuit, and a voltage applied to the primary winding via the auxiliary switching unit induces a voltage in the secondary winding in a direction from a first main terminal of the secondary winding toward a second main terminal of the secondary winding, the first main terminal of the secondary winding is disposed at a low-potential side of the main series circuit and the second main terminal of the secondary is disposed at a high-potential side of the main series circuit, and
   the rectifying unit blocks a current flowing from the high-potential side of the main series circuit toward the low-potential side of the main series circuit through a current path that includes the secondary winding and bypasses the one of the two circuit elements included in the main series circuit.

2. The power conversion device according to claim 1, wherein
   the two circuit elements included in the main series circuit are provided by two conduction control elements, and
   an operation state of each of the two conduction control elements switches between a conduction state and a non-conduction state.

3. The power conversion device according to claim 1, wherein
   the two circuit elements included in the main series circuit are provided by a conduction control element and a rectifying element,
   an operation state of the conduction control element switches between a conduction state and a non-conduction state, and
   the rectifying element allows an electric current to flow in one direction and blocks an electric current in an opposite direction.

4. The power conversion device according to claim 2, wherein
   the auxiliary switching unit turns on before a turning on of the conduction control element.

5. The power conversion device according to claim 3, wherein
   the auxiliary switching unit turns on before a turning on of the conduction control element.

6. The power conversion device according to claim 2, wherein
   the secondary winding is connected between a first main terminal of one of the two conduction control elements and a second main terminal of the one of the two conduction control elements,
   the first main terminal of the one of the two conduction control elements is disposed at the high-potential side and the second main terminal of the one of the two conduction control elements is disposed at the low-potential side, and the rectifying unit blocks a current flowing from the first main terminal of the one of the two conduction control elements toward the second main terminal of the one of the two conduction control elements.

7. The power conversion device according to claim 3, wherein
   the secondary winding is connected between a first main terminal of the rectifying element and a second main terminal of the rectifying element,
   the first main terminal of the rectifying element is disposed at the high-potential side and the second main terminal of the rectifying element is disposed at the low-potential side, and
   the rectifying unit blocks a current flowing from the first main terminal of the rectifying element toward the second main terminal of the rectifying element.

8. The power conversion device according to claim 1, wherein
   the secondary winding includes at least two sub windings and the at least two sub windings include a first sub winding and a second sub winding,
   the first sub winding is connected between the main terminals of the one of the two circuit elements included in the main series circuit,
   the second sub winding is connected between main terminals of a remaining one of the two circuit elements included in the main series circuit, and
   the rectifying unit blocks a current flowing from the main terminal of the one of the two circuit elements, which is disposed at the high-potential side, toward the main terminal of the remaining one of the two circuit elements, which is disposed at the low-potential side.

9. The power conversion device according to claim 1, wherein,
   the primary winding of the transformer has a quantity of turns larger than a quantity of turns of the secondary winding of the transformer.

10. The power conversion device according to claim 1, wherein
    the auxiliary switching unit includes two auxiliary series circuits connected with the main series circuit in parallel and the two auxiliary series circuits include a first auxiliary series circuit and a second auxiliary series circuit, the first auxiliary series circuit includes a first auxiliary switching element and a first auxiliary rectifying unit connected in series at a first common connection point, the first auxiliary switching element is disposed at the high-potential side and an operation state of the first auxiliary switching element switches between a conduction state and a non-conduction state, the first auxiliary rectifying unit is disposed at the low-potential side and blocks a current flowing from the high-potential side toward the low-potential side, the second auxiliary series circuit includes a second auxiliary rectifying unit and a second auxiliary switching element connected in series at a second common connection point, the second auxiliary rectifying unit is disposed at the high-potential side and blocks a current flowing from the high-potential side toward the low-potential side, the second auxiliary switching element is disposed at the low-potential side and an operation state of the second auxiliary switching element switches between a conduction state and a non-conduction state, and the primary winding is connected between the first common connection point of the first auxiliary series circuit and the second common connection point of the second auxiliary series circuit.

11. The power conversion device according to claim 10, wherein at least one of the first auxiliary rectifying unit or the second auxiliary rectifying unit includes at least two auxiliary rectifying elements connected in series at a common connection point, and each of the auxiliary rectifying elements blocks a current flowing from the high-potential side toward the low-potential side, each of the auxiliary rectifying elements allows an electric current to flow in one direction and blocks an electric current in an opposite direction, and at least one of the first auxiliary rectifying unit or the second auxiliary rectifying unit includes an electricity storage element connected between the common connection point of the at least two auxiliary rectifying elements and the common connection point of the main series circuit.

12. The power conversion device according to claim 11, wherein a turn-on time of the first auxiliary switching element and a turn-on time of the second auxiliary switching element are determined according to an electric capacity of the electricity storage element.

13. The power conversion device according to claim 11, wherein an electric capacity of the electricity storage element is switchable.

14. The power conversion device according to claim 2, wherein the secondary winding is connected with an auxiliary inductance element in series, and the secondary winding and the auxiliary inductance element are disposed between the main terminals of one of the two conduction control elements.

15. The power conversion device according to claim 3, wherein the secondary winding is connected with an auxiliary inductance element in series, and the secondary winding and the auxiliary inductance element are disposed between the main terminals of the conduction control element.

16. The power conversion device according to claim 14, wherein the auxiliary inductance element is provided by a leakage inductance of the secondary winding of the transformer.

17. The power conversion device according to claim 14, wherein the auxiliary inductance element is magnetically coupled with the transformer as a coupled inductor, the coupled inductor includes a first sub inductor and a second sub inductor, the first sub inductor is connected between the main terminals of the one of the two conduction control elements and the second sub inductor is connected between the main terminals of a remaining one of the two conduction control elements, and when a voltage applied to one of the first sub inductor or the second sub inductor has a higher potential at one end corresponding to the common connection point of the main series circuit compared with a remaining end, a power is induced in a remaining one of the first sub inductor or the second sub inductor so that a potential at an end corresponding to the common connection point of the main series circuit is higher than a remaining end.

18. The power conversion device according to claim 15, wherein the auxiliary inductance element is magnetically coupled with the transformer as a coupled inductor, the coupled inductor includes a first sub inductor and a second sub inductor, the first sub inductor is connected between the main terminals of the conduction control element and the second sub inductor is connected between the main terminals of the rectifying element, and when a voltage applied to one of the first sub inductor or the second sub inductor has a higher potential at one end corresponding to the common connection point of the main series circuit compared with a remaining end, a power is induced in a remaining one of the first sub inductor or the second sub inductor so that a potential at an end corresponding to the common connection point of the main series circuit is higher than a remaining end.

19. The power conversion device according to claim 1, wherein a turn-on time of the first auxiliary switching element and a turn-on time of the second auxiliary switching element are determined according to at least one of a current flowing through the main inductance element or a voltage applied between terminals of the main series circuit.

20. The power conversion device according to claim 1, further comprising a current detection unit detecting a current flowing through the main inductance element, wherein when an absolute value of the current detected by the current detection unit is lower than a predetermined threshold value, the auxiliary switching element or the second auxiliary switching element is maintained in an off state for one operation cycle.

* * * * *